United States Patent
Joshi et al.

(10) Patent No.: US 10,687,064 B2
(45) Date of Patent: Jun. 16, 2020

(54) PALETTE MODE ENCODING AND DECODING WITH INFERRED PIXEL SCAN ORDER

(71) Applicant: QUALCOMM Incorporated, San Diego, CA (US)

(72) Inventors: Rajan Laxman Joshi, San Diego, CA (US); Wei Pu, San Diego, CA (US); Vadim Seregin, San Diego, CA (US); Joel Sole Rojals, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 831 days.

(21) Appl. No.: 14/816,980

(22) Filed: Aug. 3, 2015

(65) Prior Publication Data

US 2016/0037164 A1 Feb. 4, 2016

Related U.S. Application Data

(60) Provisional application No. 62/033,067, filed on Aug. 4, 2014, provisional application No. 62/044,088, filed
(Continued)

(51) Int. Cl.
*H04N 19/136* (2014.01)
*H04N 19/176* (2014.01)
(Continued)

(52) U.S. Cl.
CPC ......... *H04N 19/136* (2014.11); *H04N 19/129* (2014.11); *H04N 19/176* (2014.11);
(Continued)

(58) Field of Classification Search
CPC ..... H04N 19/129; H04N 19/182; H04N 19/70
See application file for complete search history.

(56) References Cited

U.S. PATENT DOCUMENTS

| | | |
|---|---|---|
| 2015/0341635 A1 | 11/2015 | Seregin et al. |
| 2015/0341656 A1 | 11/2015 | Seregin et al. |
| 2015/0341674 A1 | 11/2015 | Seregin et al. |

FOREIGN PATENT DOCUMENTS

| | | |
|---|---|---|
| EP | 0166966 A2 | 1/1986 |
| EP | 2618565 A1 | 7/2013 |
| WO | 2015176685 A1 | 11/2015 |

OTHER PUBLICATIONS

International Preliminary Report on Patentability from International Application No. PCT/US2015/043572, dated Jan. 27, 2017, 13 pp.
(Continued)

*Primary Examiner* — Y Lee
(74) *Attorney, Agent, or Firm* — Shumaker & Sieffert, P.A.

(57) ABSTRACT

In an example, a method of processing video data may include inferring a pixel scan order for a first palette mode encoded block of video data without receiving a block-level syntax element having a value representative of the pixel scan order for the first palette mode encoded block. The method may include decoding the first palette mode encoded block of video data using the inferred pixel scan order. The method may include receiving a block-level syntax element having a value representative of a pixel scan order for a second palette mode encoded block of video data. The method may include determining the pixel scan order for the second palette mode encoded block of video data based on the received block-level syntax element. The method may include decoding the second palette mode encoded block of video data using the determined pixel scan order.

5 Claims, 11 Drawing Sheets

Related U.S. Application Data on Aug. 29, 2014, provisional application No. 62/062,674, filed on Oct. 10, 2014.

(51) Int. Cl.
*H04N 19/44* (2014.01)
*H04N 19/182* (2014.01)
*H04N 19/70* (2014.01)
*H04N 19/129* (2014.01)
*H04N 19/463* (2014.01)
*H04N 19/186* (2014.01)
*H04N 19/93* (2014.01)

(52) U.S. Cl.
CPC ......... *H04N 19/182* (2014.11); *H04N 19/186* (2014.11); *H04N 19/44* (2014.11); *H04N 19/463* (2014.11); *H04N 19/70* (2014.11); *H04N 19/93* (2014.11)

(56) References Cited

OTHER PUBLICATIONS

Guo, et al.,"RCE4: Results of Test 2 on Palette Mode for Screen Content Coding", 16th Meeting; Jan. 9 through 17th, 2014 ; San Jose, CA, USA; (Joint Collaborative Team on Video Coding of ISO/IEC JTC1/SC29/WG11 and ITU-T SG.16 ); URL: http://wftp3.itu.int/av-arch/jctvc-site/, No. JCTVC-P0198-v3, Jan. 8, 2014 , XP030115731, 10 pp.

Huang Y-W., et al., "HEVC Screen Content Core Experiment 3 (SCCE3): Palette Mode", 17th Meeting, Mar. 27, 2014-Apr. 4, 2014, Valencia, ES; (Joint Collaborative Team on Video Coding of ISO/IEC JTC1/SC29/WG11 and ITU-T SG.16 ), URL: http://wftp3.itu.itu.int/av-arch/jctvc-site/, No. JCTVC-Q1123, Apr. 18, 2014, XP030116244, 11 pp.

International Search Report and Written Opinion for International Application No. PCT/US2015/043572, dated Oct. 6, 2015, 15 pp.

Pu, et al., "Non-CE6: Syntax Redundancy Fixes for Palette Mode", 19th Meeting; Oct. 17th-24th, 2014; Strasbourg, FR; (Joint Collaborative Team on Video Coding of ISO/IEC JTC1/SC29/WG11 and ITU-T SG.16 ); URL: http://wftp3.itu.int/av-arch/jctvc-site/, No. JCTVC-S0110-v4, Oct. 21, 2014, XP030116863, 7 pp.

Pu, et al., "Non-RCE4: Refinement of the palette in RCE4 Test 2", 16th Meeting; Jan. 9-17, 2014; San Jose, CA, USA; (Joint Collaborative Team on Video Coding of ISO/IEC JTC1/SC29/WG11 and ITU-T SG.16); URL: http://wftp3.itu.int/av-arch/jctvc-site/, No. JCTVC-P0231, Jan. 7, 2014, XP030115773, 4 pp.

Pu, et al.,"SCCE3: Test B.13 Flag to Indicate Escape and Index Coding ," 18th Meeting, Jun. 30, 2014-Jul. 9, 2014, Sapporo,JP; (Joint Collaborative Team on Video Coding of ISO/IEC JTC1/SC29/WG11 and ITU-T SG.16 ); URL: http://wftp3.itu.int/av-arch/jctvc-site/, No. JCTVC-R0066, Jun. 21, 2014 XP030116310, 3 pp.

Sansli, et al.,"SCCE3: Test B.15 Scanning Indicator for The Palette Coded CUs", 18th Meeting, Jun. 30- Jul. 9, 2014, Sapporo,JP; (Joint Collaborative Team on Video Coding of ISO/IEC JTC1/SC29/WG11 and ITU-T SG.16), URL: http://wftp3.itu.int/av-arch/jctvc-site/, No. JCTVC-R0048, Jun. 20, 2014, XP030116287, 3 pp.

Sole, et al.,"Non-SCCE3: Delta QP Signaling in Palette Mode ," 18th Meeting; Jun. 30-Jul. 9, 2014, Sapporo, JP; (Joint Collaborative Team on Video Coding of ISO/IEC JTC1/SC29/WG11 and ITU-T SG.16 ), URL: http://wftp3.itu.int/av-arch/jctvc-site/ss, No. JCTVC-R0237, Jun. 21, 2014, XP030116541, 3 pp.

Sun, et al., "SCCE3 Test B.4: Adaptive Color Index Map Scan ," 18th Meeting; Jun. 30-Jul. 9, 2014, Sapporo, JP; (Joint Collaborative Team on Video Coding of ISO/IEC JTC1/SC29/WG11 and ITU-T SG.16 ), URL: http://wftp3.itu.int/av-arch/jctvc-site/, No. JCTVC-R0057-v2, Jun. 27, 2014 , XP030116300, 8 pp.

Zhu, et al., "AHG10: Adaptive Scan Order on Palette Based Coding", 17th Meeting, Mar. 27-Apr. 4, 2014, Valencia,ES; (Joint Collaborative Team on Video Coding of ISO/IEC JTC1/SC29/WG11 and ITU-T SG.16), URL: http://wftp3.itu.int/av-arch/jctvc-site/, No. JCTVC-Q0169-v2, Mar. 29, 2014, XP030116116, 4 pp.

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video , Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Onno et al., "Suggested combined software and text for run-based palette mode", 18th Meeting, Jun. 30-Jul. 9, 2014, Sapporo, JP; (Joint Collaborative Team on Video Coding (JCT-VC) of ITU-T SG 16 WP 3 and ISO/IEC JTC 1/SC 29/WG 11); JCTVC-R0348, Jul. 9, 2014, 10 pp.

Onno et al., "JCTVC-R0348: Suggested conbined software and text for run-based palette mode, "18th Meeting, Jun. 30-Jul. 9, 2014, Sapporo, JP; (Joint Collaborative Team on Video Coding (JCT-VC) of ITU-T SG 16 WP 3 and ISO/IEC JTC 1/SC 29/WG 11); JCTVC-R0348, Jul. 9, 2014, 12 pp.

Onno et al., "JCTVC-R0348: Final Palette Text Specification", 18th Meeting, Jun. 30 through Jul. 9, 2014, Sapporo, JP; (Joint Collab-

(56) References Cited

OTHER PUBLICATIONS orative Team on Video Coding (JCT-VC) of ITU-T SG 16 WP 3 and ISO/IEC JTC 1/SC 29/WG 11); JCTVC-R0348, Jul. 9, 2014, 13 pp.
Bross et al., "High Efficiency Video Coding (HEVC) text specification draft 10 (for FDIS & Consent)", 12th Meeting, Jan. 14-23, 2014, Geneva, CH; (Joint Collaborative Team on Video Coding (JCT-VC) of ITU-T SG 16 WP 3 and ISO/IEC JTC 1/SC 29/WG 11), JCTVC-L1003_v13, Jan. 30, 2013, 332 pp.
Pu et al., "AHG10: Suggested Software for Palette Coding based on RExt6.0", 17th Meeting, Mar. 27-Apr. 4, 2014, Valencia, ES; (Joint Collaborative Team on Video Coding (JCT-VC)of ITU-T SG16 WP3 and ISO/IEC JTC1/SC29/WG11); JCTVC-Q0094, Mar. 19, 2014, 4 pp.
Seregin et al., "Non-SCCE3: Run-legnth coding for palette predictor", 18th Meeting, Jun. 30- Jul. 9, 2014, Sapporo, JP; (Joint Collaborative Team on Video Coding (JCT-VC) of ITU-T SG16 WP 3 and ISO/IEC JTC 1/SC 29/WG 11), JCTVC-R0228r1, Jul. 2, 2014, 4 pp.
Response to Written Opinion dated Oct. 6, 2015, from International Application No. PCT/US2015/043572, filed on Jun. 2, 2016, 9 pp.
Second Written Opinion from International Application No. PCT/US2015/043572, dated Aug. 30, 2016, 14 pp.
Response to Second Written Opinion dated Aug. 30, 2016, from International Application No. PCT/US2015/043572, filed on Oct. 27, 2016, 11 pp.
Third Written Opinion from International Application No. PCT/US2015/043572, dated Nov. 16, 2016, 10 pp.
Response to Third Written Opinion dated Nov. 16, 2016, from International Application No. PCT/US2015/043572, filed on Dec. 16, 2016, 4 pp.
Lai P., et al., "Description of Screen Content Coding Technology Proposal by MediaTek," 17, JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0033-v4, Mar. 26, 2014 (Mar. 26, 2014), pp. 1-31, XP030115920.
Taiwan Search Report—TW104125269—TIPO—Feb. 18, 2019 1 pg.
Lai P., et al., "Description of Screen Content Coding Technology Proposal by MediaTek," Joint Collaborative Team on Video Coding (JCT-VC) of ITU-T SG 16 WP 3 and ISO/IEC JTC 1/SC 29/WG 11 17th Meeting: Valencia, ES, pp. 1-31, Mar. 27-Apr. 4, 2014, [JCTVC-Q0033_r1].
Pu W., et al., "Non-RCE4: Refinement of the Palette in RCE4 Test 2," Joint Collaborative Team on Video Coding (JCT-VC) of ITU-T SG 16 WP 3 and ISO/IEC JTC 1/SC 29/WG 11, 16th Meeting: San Jose, US, Jan. 2014, JCTVC-P0231r3, pp. 1-4.
Pu W., et al., "SCCE3: Test B.12—Binarization of Escape Sample and Palette Index," 18th meeting, JCT-VC Meeting; Jun. 30, 2014-Jul. 9, 2014; Sapporo; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/,, No. JCTVC-R0065, Jun. 21, 2014, pp. 1-3.
Sansli D.B., et al., "SCCE3: Test B.15—Scanning Indicator for the Palette Coded CUs," Joint Collaborative Team on Video Coding (JCT-VC) of ITU-T SG16 WP3 and ISO/IEC JTC1/SC29/WG11, 18th Meeting: Sapporo, JP, Jun. 2014, JCTVC-R0048_v1, pp. 1-3.

PALETTE MODE ENCODING AND DECODING WITH INFERRED PIXEL SCAN ORDER

RELATED APPLICATIONS

This application claims the benefit of U.S. Provisional Application No. 62/033,067 filed on Aug. 4, 2014, U.S. Provisional Application No. 62/044,088 filed on Aug. 29, 2014, and U.S. Provisional Application No. 62/062,674 filed on Oct. 10, 2014, each of which is hereby incorporated by reference in its entirety.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

Techniques of this disclosure relate to palette-based video coding. For example, in palette-based video coding, a video coder (e.g., a video encoder or video decoder) may form a "palette" as a table of colors for representing the video data of the particular area (e.g., a given block). Palette-based video coding may be especially useful for coding areas of video data having a relatively small number of colors. Rather than coding actual pixel values (or their residuals), the video coder may code palette indices for one or more of the pixels that relate the pixels with entries in the palette representing the colors of the pixels. The techniques described in this disclosure may include techniques for various combinations of one or more of signaling palette-based video coding modes, transmitting palettes, deriving palettes, deriving the value of non-transmitted syntax elements, and transmitting palette-based video coding maps and other syntax elements.

In one example, a method of decoding video data may include receiving a first palette mode encoded block of video data of a picture. The method may include inferring a pixel scan order for the first palette mode encoded block of video data without receiving a block-level syntax element having a value representative of the pixel scan order for the first palette mode encoded block. The method may include decoding the first palette mode encoded block of video data using the inferred pixel scan order. The method may include receiving a second palette mode encoded block of video data of the picture. The method may include receiving a block-level syntax element having a value representative of a pixel scan order for the second palette mode encoded block of video data. The method may include determining the pixel scan order for the second palette mode encoded block of video data based on the received block-level syntax element. The method may include decoding the second palette mode encoded block of video data using the determined pixel scan order.

In another example, a device may include a memory configured to store video data of a picture. The device may include a video decoder configured to receive a first palette mode encoded block of video data of a picture. The video decoder may be configured to infer a pixel scan order for the first palette mode encoded block of video data not based on a block-level syntax element having a value representative of the pixel scan order for the first palette mode encoded block. The video decoder may be configured to decode the first palette mode encoded block of video data based on the inferred pixel scan order. The video decoder may be configured to receive a second palette mode encoded block of video data of the picture. The video decoder may be configured to receive a block-level syntax element having a value representative of a pixel scan order for the second palette mode encoded block of video data. The video decoder may be configured to determine the pixel scan order for the second palette mode encoded block of video data based on the block-level syntax element for the second palette mode encoded block of video data. The video decoder may be configured to decode the second palette mode encoded block of video data based on the determined pixel scan order.

In another example, a non-transitory computer-readable storage medium having instructions stored thereon that, when executed, cause one or more processors of a computing device configured to decode video data to receive a first palette mode encoded block of video data of a picture. The non-transitory computer-readable storage medium may have instructions stored thereon that, when executed, cause one or more processors of the computing device configured to decode video data to infer a pixel scan order for the first palette mode encoded block of video data not based on a block-level syntax element having a value representative of the pixel scan order for the first palette mode encoded block. The non-transitory computer-readable storage medium may have instructions stored thereon that, when executed, cause one or more processors of the computing device configured to decode video data to decode the first palette mode encoded block of video data based on the inferred pixel scan order. The non-transitory computer-readable storage medium may have instructions stored thereon that, when executed, cause one or more processors of the computing device configured to decode video data to receive a second palette mode encoded block of video data of the picture. The non-transitory computer-readable storage medium may have instructions stored thereon that, when executed, cause one or more processors of the computing device configured to decode video data to receive a block-level syntax element having a value representative of a pixel scan order for the second palette mode encoded block of video data. The non-transitory computer-readable storage medium may have instructions stored thereon that, when executed, cause one or more processors of the computing device configured to decode video data to determine the pixel scan order for the second palette mode encoded block of video data based on the block-level syntax element for the second palette mode encoded block of video data. The non-transitory computer-readable storage medium may have instructions stored thereon that, when executed, cause one or more processors of the computing device configured to decode video data to decode the second palette mode encoded block of video data based on the determined pixel scan order.

In another example, a device may include means for receiving a first palette mode encoded block of video data of a picture. The device may include means for inferring a pixel scan order for the first palette mode encoded block of video data without receiving a block-level syntax element having a value representative of the pixel scan order for the first palette mode encoded block. The device may include means for decoding the first palette mode encoded block of video data using the inferred pixel scan order. The device may include means for receiving a second palette mode encoded block of video data of the picture. The device may include means for receiving a block-level syntax element having a value representative of a pixel scan order for the second palette mode encoded block of video data. The device may include means for determining the pixel scan order for the second palette mode encoded block of video data based on the received block-level syntax element. The device may include means for decoding the second palette mode encoded block of video data using the determined pixel scan order.

In yet another example, a method of encoding video data may include determining that a block of video data is to be encoded using palette mode. The method may include determining a palette size for the block of video data. The method may include determining a pixel scan order for the block of video data. The method may include encoding the block of video data using palette mode. The method may include determining whether to signal a first block-level syntax element representative of the pixel scan order used for the block of video data based on the palette size.

In yet another example, a device may include a memory configured to store video data of a picture. The device may include a video encoder configured to determine that a block of video data is to be encoded using palette mode. The video encoder may be configured to determine a palette size for the block of video data. The video encoder may be configured to determine a pixel scan order for the block of video data. The video encoder may be configured to encode the block of video data using palette mode. The video encoder may be configured to determine whether to signal a first block-level syntax element representative of the pixel scan order used for the block of video data based on the palette size.

In yet another example, a non-transitory computer-readable storage medium having instructions stored thereon that, when executed, cause one or more processors of a computing device configured to encode video data to determine that a block of video data is to be encoded using palette mode. The non-transitory computer-readable storage medium may have instructions stored thereon that, when executed, cause one or more processors of the computing device configured to encode video data to determine a palette size for the block of video data. The non-transitory computer-readable storage medium may have instructions stored thereon that, when executed, cause one or more processors of the computing device configured to encode video data to determine a pixel scan order for the block of video data. The non-transitory computer-readable storage medium may have instructions stored thereon that, when executed, cause one or more processors of the computing device configured to encode video data to encode the block of video data using palette mode. The non-transitory computer-readable storage medium may have instructions stored thereon that, when executed, cause one or more processors of the computing device configured to encode video data to determine whether to signal a first block-level syntax element representative of the pixel scan order used for the block of video data based on the palette size.

In yet another example, a device may include means for determining that a block of video data is to be encoded using palette mode. The device may include means for determining a palette size for the block of video data. The device may include means for determining a pixel scan order for the block of video data. The device may include means for encoding the block of video data using palette mode. The device may include means for determining whether to signal a first block-level syntax element representative of the pixel scan order used for the block of video data based on the palette size.

The details of one or more examples of the disclosure are set forth in the accompanying drawings and the description below. Other features, objects, and advantages will be apparent from the description, drawings, and claims.

DETAILED DESCRIPTION

Figure 1:
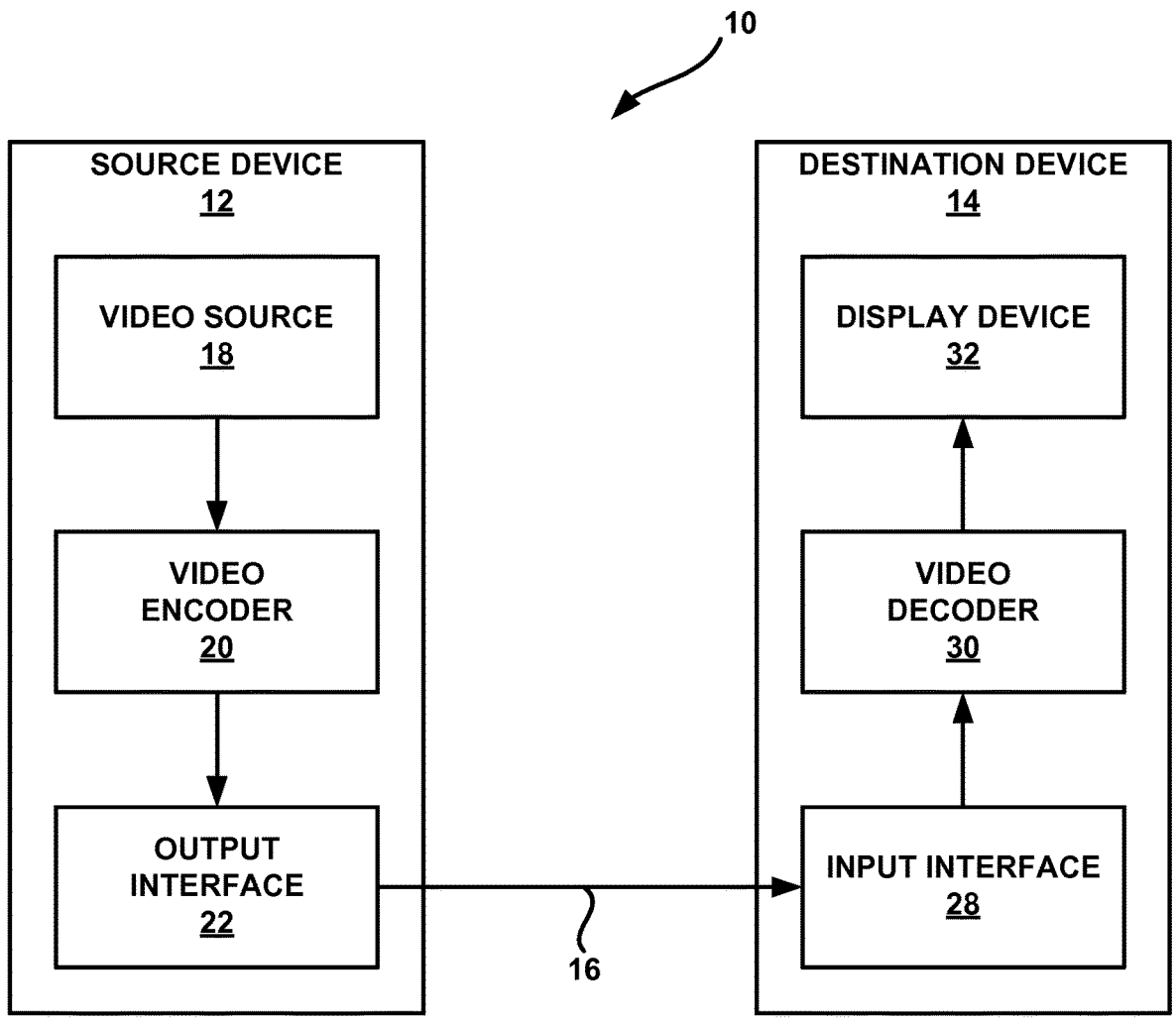
FIG. 1 is a block diagram illustrating an example video coding system that may utilize the techniques for palette-based video coding described in this disclosure.

Aspects of this disclosure are directed to techniques for video coding and video data compression. In particular, this disclosure describes techniques for palette-based video coding of video data. In traditional video coding, images are assumed to be continuous-tone and spatially smooth. Based on these assumptions, various tools have been developed such as block-based transforms, filtering, and other coding tools, and such tools have shown good performance for natural content videos. However, in applications like remote desktop, collaborative work and wireless display, computer-generated screen content may be the dominant content to be compressed. This type of screen content tends to have discrete-tone, sharp lines, and high contrast object boundaries. The assumption of continuous-tone and smoothness may no longer apply, and thus, traditional video coding techniques may be inefficient in compressing screen content.

This disclosure describes palette-based video coding techniques, which may be particularly suitable for computer-generated screen content coding (e.g., screen content coding (SCC)) or other content where one or more traditional coding tools are inefficient. The techniques for palette-based video coding of video data described in this disclosure may be used with one or more other coding techniques, such as techniques for inter- or intra-predictive coding. For example, as described in greater detail below, an encoder or decoder, or combined encoder-decoder (codec), may be configured to perform inter- and intra-predictive coding, as well as palette-based video coding.

Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The screen content coding extension to HEVC, named SCC, is also being developed by the JCT-VC. A recent Working Draft (WD) of SCC (SCC WD) including palette mode description is available in JCTVC-R0348 "JCTVC-R0348_18thMeetingFinalPaletteTextSpecification.doc".

In some examples, the palette-based video coding techniques may be configured for use with one or more video coding standards. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). High Efficiency Video Coding (HEVC) is a new video coding standard developed by the Joint Collaboration Team on Video Coding (JCT-VC) of ITU-T Video Coding Experts Group (VCEG) and ISO/IEC Motion Picture Experts Group (MPEG). A recent HEVC text specification draft is described in Bross et al., "High Efficiency Video Coding (HEVC) Text Specification Draft 10 (for FDIS & Consent)," JCVC-L1003 v13, 12$^{th}$ Meeting of JCT-VC of ITU-T SG16 WP 3 and ISO/IEC JCT 1/SC 29/WG 11, 14-23 Jan. 2013 ("HEVC Draft 10"), available from: http://phenix.int-evey.fr/jct/doc_end_user/documents/12_Geneva/wg11/JCTVC-L1003-v13.zip.

With respect to the HEVC framework, as an example, the palette-based video coding techniques of this disclosure may be configured to be used at a coding unit (CU) level. In other examples for HEVC, the palette-based video coding techniques of this disclosure may be configured to be used at the prediction unit (PU) level. In other examples for HEVC, the palette-based video coding techniques of this disclosure may be configured to be used at the sub-prediction unit (sub-PU) level (e.g., a sub-block of a prediction unit). Accordingly, all of the following disclosed processes described in the context of a CU level may, additionally or alternatively, apply to a PU level or a sub-PU level. However, these HEVC-based examples should not be considered a restriction or limitation of the palette-based video coding techniques described herein, as such techniques may be applied to work independently or as part of other existing or yet to be developed systems/standards. In these cases, the unit for palette coding can be square blocks, rectangular blocks or even regions of non-rectangular shape.

In palette-based video coding, a particular area of video data may have a relatively small number of colors. A video coder (e.g., a video encoder or video decoder) may code (i.e., encode or decode) a so-called "palette" as a table of colors for representing the video data of the particular area (e.g., a given block). Each pixel may be associated with an entry in the palette that represents the color of the pixel. For example, the video coder may code an index that relates the pixel value to the appropriate value in the palette.

In the example above, a video encoder may encode a block of video data by determining a palette for the block, locating an entry in the palette to represent the value of each pixel, and encoding the palette with palette indices (also referred to as palette index values) for the pixels relating the pixel value to the palette. A video decoder may obtain, from an encoded bitstream, a palette for a block, as well as palette indices for the pixels of the block. The video decoder may relate the palette indices of the pixels to entries of the palette to reconstruct the pixel values of the block. Pixels (and/or related palette indices that indicate a pixel value) may generally be referred to as samples.

Samples in a block of video data may be processed (e.g., scanned) using a horizontal raster scanning order or other scanning order. For example, the video encoder may convert a two-dimensional block of palette indices into a one-dimensional array by scanning the palette indices using a horizontal raster scanning order. Likewise, the video decoder may reconstruct a block of palette indices using the horizontal raster scanning order. Accordingly, this disclosure may refer to a previous sample as a sample that precedes the sample currently being coded in the block in the scanning order. It should be appreciated that scans other than a horizontal raster scan, such as vertical raster scanning order, may also be applicable. The example above, as well as other examples set forth in this disclosure, is intended to provide a general description of palette-based video coding.

A palette typically includes entries numbered by an index and representing color component (for example, RGB, YUV, YCbCr, or the like) values or intensities. Both a video encoder and a video decoder determine the number of palette entries, color component values for each palette entry and the exact ordering of the palette entries for the current block. In this disclosure, it is assumed that each palette entry specifies the values for all color components of a sample. However, the concepts of this disclosure are applicable to using a separate palette for each color component.

In some examples, a palette may be composed using information from previously coded blocks. That is, a palette may contain predicted palette entries predicted from the palette(s) used to code the previous block(s). For example, as described in Wei Pu et al., "AHG10: Suggested Software for Palette Coding based on RExt6.0," JCTVC-Q0094, Valencia, E S, 27 Mar.-4 Apr. 2014 (hereinafter JCTVC-Q0094), a palette may include entries that are copied from a predictor palette. A predictor palette may include palette entries from blocks previously coded using palette mode or other reconstructed samples. For each entry in the predictor palette, a binary flag may be coded to indicate whether the entry associated with the flag is copied to the current palette (e.g., indicated by flag=1). The string of binary flags may be referred to as the binary palette prediction vector. The palette for coding a current block may also include a number of new palette entries, which may be explicitly coded (e.g., separately from the palette prediction vector). An indication of the number of new entries may also be coded. A sum of the predicted entries and new entries may indicate the total palette size in for block.

As proposed JCTVC-Q0094, each sample in a block coded with a palette-based video coding mode may be coded using one of the three palette modes, as set forth below:

Escape mode: in this mode, the sample value is not included into a palette as a palette entry and the quantized sample value is signaled explicitly for all color components. It is similar to the signaling of the new palette entries, although for new palette entries, the color component values are not quantized.

CopyFromTop mode (also referred to as CopyAbove mode or Copy mode): in this mode, the palette entry index for the current sample is copied from the sample located directly above in a block.

Value mode (also referred to as Index mode): in this mode, the value of the palette entry index is explicitly signaled.

In some examples, escape mode is not a separate mode from CopyAbove mode or Index mode. Rather, in such examples, escape mode may be included in Copy mode or Index mode.

As described herein, a palette entry index may be referred as a palette index or simply an index. These terms can be used interchangeably to describe techniques of this disclosure. In addition, as described in greater detail below, a palette index may have one or more associated color or intensity values. For example, a palette index may have a single associated color or intensity value associated with a single color or intensity component of a pixel (e.g., an Red component of RGB data, a Y component of YUV data, or the like). In another example, a palette index may have multiple associated color or intensity values. In some instances, palette-based video coding may be applied to code monochrome video. Accordingly, "color value" may generally refer to any color or non-color component used to generate a pixel value.

For CopyFromTop and Value modes, a run value (which may also be referred to simply as a run) may also be signaled. A run value may indicate a number of consecutive samples (e.g., a run of samples) in a particular scan order in a palette-coded block that are coded together. In some instances, the run of samples may also be referred to as a run of palette indices, because each sample of the run has an associated index to a palette.

A run value may indicate a run of palette indices that are coded using the same palette-coding mode. For example, with respect to Value mode, a video coder (a video encoder or video decoder) may code a palette index (also referred to as a palette index value or simply index value) and a run value that indicates a number of consecutive samples in a scan order that have the same palette index and that are being coded with the palette index. With respect to Copy-FromTop mode, the video coder may code an indication that an index for the current sample value is copied based on an index of an above-neighboring sample (e.g., a sample that is positioned above the sample currently being coded in a block) and a run value that indicates a number of consecutive samples in a scan order that also copy a palette index from an above-neighboring sample and that are being coded with the palette index. Accordingly, in the examples above, a run of palette indices refers to a run of palette indices having the same value or a run of palette indices that are copied from above-neighboring palette indices.

Hence, the run may specify, for a given mode, the number of subsequent samples that belong to the same mode. In some instances, signaling an index and a run value may be similar to run length coding. In an example for purposes of illustration, a string of consecutive palette indices of a block may be 0, 2, 2, 2, 2, 5 (e.g., where each index corresponds to a sample in the block). In this example, a video coder may code the second sample (e.g., the first palette index value of two) using Value mode. After coding an index value that is equal to 2, the video coder may code a run of three, which indicates that the three subsequent samples also have the same palette index value of two. In a similar manner, coding a run of four palette indices after coding an index using CopyFromTop mode may indicate that a total of five palette indices are copied from the corresponding palette indices in the row above the sample position currently being coded.

The techniques described in this disclosure may include techniques for various combinations of one or more of signaling palette-based video coding modes, transmitting palettes, deriving palettes, signaling scanning order, deriving scanning order, enabling Copy mode for the first row in a block of video data, and transmitting palette-based video coding maps and other syntax elements. In some examples, the techniques of this disclosure may be used to resolve potential redundancies associated with the signaling of the palette modes, palette indices, runs and palette sizes that are present in JCTVC-Q0094 (as well as the reference software implementing the palette mode that was uploaded with the contribution JCTVC-Q0094). In some examples, the techniques of this disclosure may, among other things, be used to resolve potential redundancies associated with the signaling of scanning order. In other examples, the techniques of this disclosure may, among other things, be used to remove the unnecessary signaling of scanning order. In yet other examples, the techniques of this disclosure may, among other things, enable Copy mode for the very first row in a block of video data despite no pixels being directly above that row in that block of video data. Accordingly, as described in greater detail below, the techniques of this disclosure may, in some instances, improve efficiency and improve bitrate when coding video data using a palette mode.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for palette-based video coding in accordance with various examples described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure for palette-based video coding are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In accordance with the techniques of this disclosure video decoder 30 may be configured to infer a pixel scan order for a palette mode encoded block of video data. For example, video decoder 30 may be configured to infer the pixel scan order for an encoded block of video data without receiving a block-level syntax element having a value representative of the pixel scan order for the encoded block of video data. As another example, video decoder 30 may be configured to infer the pixel scan order for an encoded block of video data not based a block-level syntax element having a value representative of the pixel scan order for the encoded block of video data because the block-level syntax element (i) was not transmitted to video decoder 30, (ii) is not received by video decoder 30, or (iii) is received by video decoder 30 but video decoder 30 is configured to infer the pixel scan order without reference to the received block-level syntax element.

For example, video decoder 30 may be configured to receive a first palette mode encoded block of video data of a picture. Video decoder 30 may be configured to infer a pixel scan order for the first palette mode encoded block of video data without receiving a block-level syntax element having a value representative of the pixel scan order for the first palette mode encoded block. In another example, video decoder 30 may be configured to infer a pixel scan order for the first palette mode encoded block of video data not based on a block-level syntax element (whether received or not) having a value representative of the pixel scan order for the first palette mode encoded block. Video decoder 30 may be configured to decode the first palette mode encoded block of video data using the inferred pixel scan order.

In some examples, video decoder 30 may be configured to receive a second palette mode encoded block of video data of the picture. In such examples, video decoder 30 may be configured to receive a block-level syntax element having a value representative of a pixel scan order for the second palette mode encoded block of video data. Video decoder 30 may be configured to determine the pixel scan order for the second palette mode encoded block of video data based on the received block-level syntax element. Video decoder 30 may be configured to decode the second palette mode encoded block of video data using the determined pixel scan order.

In another example according to the techniques of this disclosure, video encoder 20 may be configured to determine whether to signal a scanning order for a block of video data. Video encoder 20 may be configured to signal or not signal a scanning order for the block of video data based on this determination. For example, determining whether to signal a scanning order may be based on the palette size of the block of video data.

For example, video encoder 20 may be configured to determine that a block of video data is to be encoded using palette mode. Video encoder 20 may be configured to determine a palette size for the block of video data. Video encoder 20 may be configured to determine a pixel scan order for the block of video data. Video encoder 20 may be configured to encode the block of video data using palette mode. Video encoder 20 may be configured to determine whether to signal a first block-level syntax element representative of the pixel scan order used for the block of video data based on the palette size.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as HEVC standard mentioned above, and described in HEVC Draft 10. In addition to the base HEVC standard, there are ongoing efforts to produce scalable video coding, multiview video coding, and 3D coding extensions for HEVC. In addition, palette-based video coding modes, e.g., as described in this disclosure, may be provided for extension of the HEVC standard. In some examples, the techniques described in this disclosure for palette-based video coding may be applied to encoders and decoders configured to operation according to other video coding standards, such as the ITU-T-H.264/AVC standard or future standards. Accordingly, application of a palette-based video coding mode for coding of coding units (CUs) or prediction units (PUs) in an HEVC codec is described for purposes of example.

In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform palette-based video coding. For example, in palette-based video coding, rather than performing the intra-predictive or inter-predictive coding techniques described above, video encoder 20 and video decoder 30 may code a so-called palette as a table of colors for representing the video data of the particular area (e.g., a given block). Each pixel may be associated with an entry in the palette that represents the color of the pixel. For example, video encoder 20 and video decoder 30 may code an index that relates the pixel value to the appropriate value in the palette.

In the example of palette-based video coding, video encoder 20 may encode a block of video data by determining a palette for the block, locating an entry in the palette to represent the value of each pixel, and encoding the palette with index values for the pixels relating the pixel value to the palette. Video decoder 30 may obtain, from an encoded bitstream, a palette for a block, as well as index values for the pixels of the block. Video decoder 30 may relate the index values of the pixels to entries of the palette to reconstruct the pixel values of the block.

In some examples of the disclosure, video encoder 20 may encode one or more syntax elements indicating a number of consecutive pixels in a given scan order that have the same pixel value. The string of like-valued pixel values may be referred to herein as a "run." In an example for purposes of illustration, if two consecutive pixels in a given scan order have different values, the run is equal to zero. If two consecutive pixels in a given scan order have the same value but the third pixel in the scan order has a different value, the run is equal to one. Video decoder 30 may obtain the syntax elements indicating a run from an encoded bitstream and use the data to determine the number of consecutive pixel locations that have the same index value.

In some examples of the disclosure, video encoder 20 and video decoder 30 may perform line copying for one or more entries of a map. For example, video encoder 20 may indicate that a pixel value for a particular entry in a map is equal to an entry in a line above the particular entry. Video encoder 20 may also indicate, as a run, the number of indices in the scan order that are equal to the entry in the line above of the particular entry. In this example, video encoder 20 and or video decoder 30 may copy index values from the specified neighboring line and from the specified number of entries for the line of the map currently being coded.

Several proposals have been made to make HEVC-based codecs more parallel-friendly, including tiles and wavefront parallel processing (WPP). HEVC WD10 defines tiles as an integer number of coding tree blocks co-occurring in one column and one row, ordered consecutively in a coding tree block raster scan of the tile. The division of each picture into tiles is a partitioning. The number of tiles and the location of their boundaries may be defined for the entire sequence or changed from picture to picture. Tile boundaries, similarly to slice boundaries, break parse and prediction dependences so that a tile can be processed independently, but the in-loop filters (deblocking and sample adaptive offset (SAO)) can still cross tile boundaries. HEVC WD10 also specifies some constraints on the relationship between slices and tiles.

According to aspects of this disclosure, video encoder 20 and video decoder 30 may perform any combination of the techniques for palette mode coding described herein, such as with respect to FIGS. 4-11 below.

Figure 2:
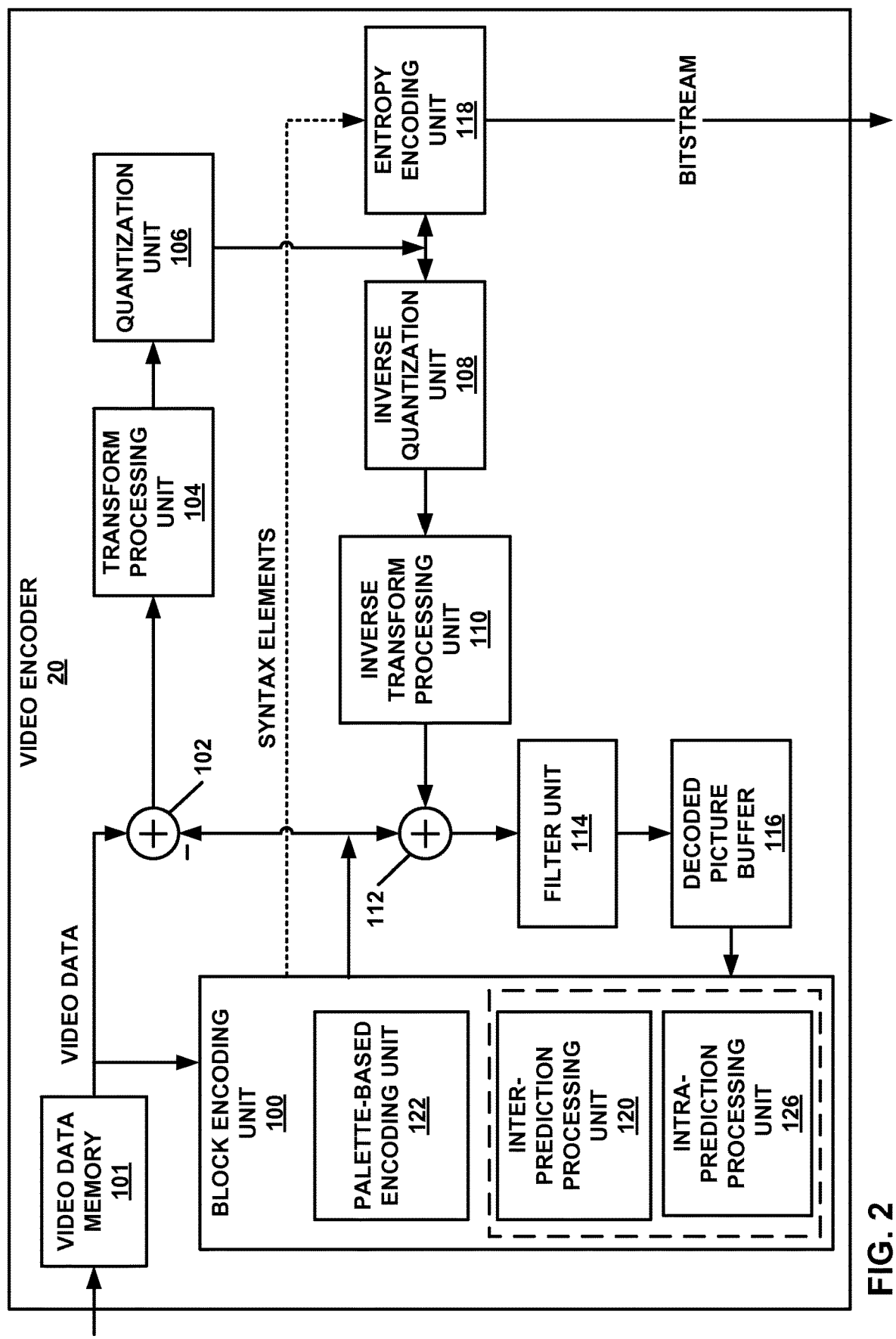
FIG. 2 is a block diagram illustrating an example video encoder that may implement the techniques for palette-based video coding described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively code various blocks of video data, such as CUs or PUs in HEVC coding, using either palette-based video coding or non-palette-based video coding. Non-palette-based video coding modes may refer to various inter-predictive temporal coding modes or intra-predictive spatial coding modes, such as the various coding modes specified by HEVC Draft 10. Video encoder 20, in one example, may be configured to generate a palette having entries indicating pixel values, select pixel values in a palette to represent pixels values of at least some pixel locations in a block of video data, and signal information associating at least some of the pixel locations in the block of video data with entries in the palette corresponding, respectively, to the selected pixel values in the palette. The signaled information may be used by video decoder 30 to decode video data.

In the example of FIG. 2, video encoder 20 includes a block encoding unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Block encoding unit 100 includes an inter-prediction processing unit 120 and an intra-prediction processing unit 126. Inter-prediction processing unit 120 includes a motion estimation unit and a motion compensation unit (not shown). Video encoder 20 also includes a palette-based encoding unit 122 configured to perform various aspects of the palette-based video coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. Decoded picture buffer (DPB) 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, block encoding unit 100 may perform quad-tree partitioning to divide the CTBs of the CTU into progressively-smaller blocks. The smaller block may be coding blocks of CUs. For example, block encoding unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, block encoding unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit may generate the predictive blocks of the PU based at least in part on actual or interpolated samples at the reference regions indicated by the motion vectors of the PU.

In accordance with various examples of this disclosure, video encoder 20 may be configured to perform palette-based video coding. With respect to the HEVC framework, as an example, the palette-based video coding techniques may be configured to be used at the CU level. In other examples, the palette-based video coding techniques may be configured to be used at the PU level. In other examples, the palette-based video coding techniques may be configured to be used at the sub-prediction unit (sub-PU) level (e.g., a sub-block of a prediction unit). Accordingly, all of the disclosed processes described herein (throughout this disclosure) in the context of a CU level may, additionally or alternatively, apply to a PU level or a sub-PU level. However, these HEVC-based examples should not be considered a restriction or limitation of the palette-based video coding techniques described herein, as such techniques may be applied to work independently or as part of other existing or yet to be developed systems/standards. In these cases, the unit for palette coding can be square blocks, rectangular blocks or even regions of non-rectangular shape.

Palette-based encoding unit 122, for example, may perform palette-based encoding when a palette-based encoding mode is selected, e.g., for a CU or PU. For example, palette-based encoding unit 122 may be configure to generate a palette having entries indicating pixel values, select pixel values in a palette to represent pixels values of at least some positions of a block of video data, and signal information associating at least some of the positions of the block of video data with entries in the palette corresponding, respectively, to the selected pixel values. Although various functions are described as being performed by palette-based encoding unit 122, some or all of such functions may be performed by other processing units, or a combination of different processing units.

According to aspects of this disclosure, palette-based encoding unit 122 may be configured to perform any combination of the techniques for palette coding described herein, such as with respect to FIGS. 4-11 below.

For example, palette-based encoding unit 122 may be configured to determine whether to signal a scanning order for a block of video data. Palette-based encoding unit 122 may be configured to signal or not signal a scanning order for the block of video data based on this determination. For example, determining whether to signal a scanning order may be based on the palette size of the block of video data.

For example, palette-based encoding unit 122 may be configured to determine that a block of video data is to be encoded using palette mode. Palette-based encoding unit 122 may be configured to determine a palette size for the block of video data. Palette-based encoding unit 122 may be configured to determine a pixel scan order for the block of video data. Palette-based encoding unit 122 may be configured to encode the block of video data using palette mode. Palette-based encoding unit 122 may be configured to determine whether to signal a first block-level syntax element representative of the pixel scan order used for the block of video data based on the palette size.

As another example, according to aspects of this disclosure, palette-based encoding unit 122 may be configured to encode at least one pixel in a first row of pixels in a palette mode encoded block of video data using Copy mode where no other row of the plurality of rows of pixels is above the first row.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Block encoding unit 100 may select the predictive data for PUs of a CU from among the predictive data generated by inter-prediction processing unit 120 for the PUs or the predictive data generated by intra-prediction processing unit 126 for the PUs. In some examples, block encoding unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by block encoding unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Filter unit 114 may perform other filtering operations, including sample adaptive offset (SAO) filtering and/or adaptive loop filtering (ALF). Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from block encoding unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

According to aspects of this disclosure, entropy encoding unit 118 may be configured to code palette data using a kth order truncated Exponential-Golomb (TEGk) code as described herein with respect to various figures of this disclosure, such as FIG. 1. In particular, according to aspects of this disclosure, entropy encoding unit 118 may encode data that indicates at least one pixel in a first row of pixels of an encoded block of video data was encoded using Copy mode. In some examples, entropy encoding unit 118 may encode the first-row Copy mode enabled data using TEGk code.

Figure 3:
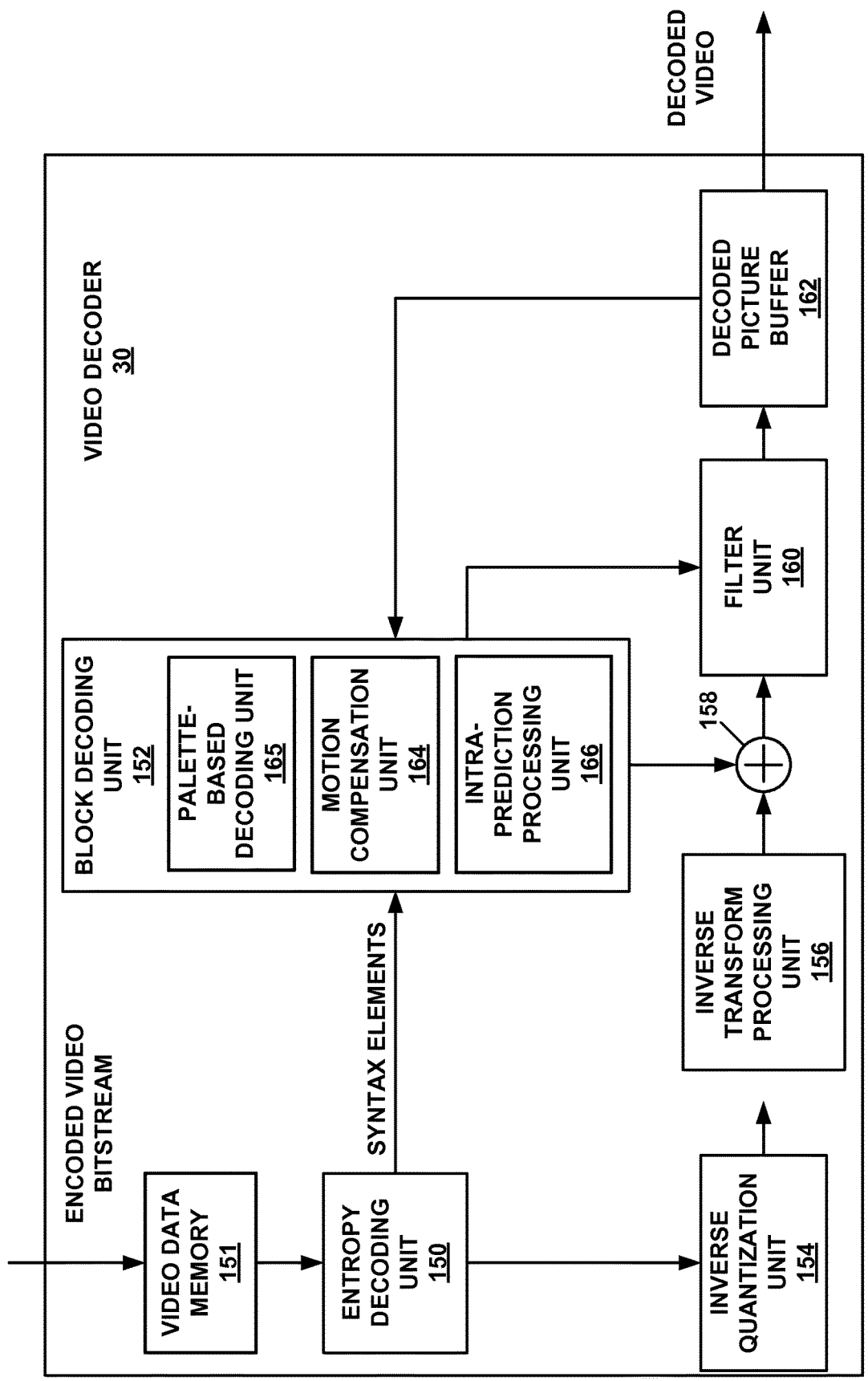
FIG. 3 is a block diagram illustrating an example video decoder that may implement the techniques for palette-based video coding described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 20 represents an example of a device that may be configured to perform techniques for palette-based video coding in accordance with various examples described in this disclosure. For example, video encoder 20 may be configured to selectively decode various blocks of video data, such as CUs or PUs in HEVC coding, using either palette-based video coding or non-palette-based video coding. Non-palette-based video coding modes may refer to various inter-predictive temporal coding modes or intra-predictive spatial coding modes, such as the various coding modes specified by HEVC Draft 10. Video decoder 30, in one example, may be configured to generate a palette having entries indicating pixel values, receive information associating at least some pixel locations in a block of video data with entries in the palette, select pixel values in the palette based on the information, and reconstruct pixel values of the block based on the selected pixel values in the palette.

In the example of FIG. 3, video decoder 30 includes an entropy decoding unit 150, video data memory 151, a block decoding unit 152, an inverse quantization unit 154, an inverse transform processing unit 156, a reconstruction unit 158, a filter unit 160, and a decoded picture buffer 162. Block decoding unit 152 includes a motion compensation unit 164 and an intra-prediction processing unit 166. Video decoder 30 also includes a palette-based decoding unit 165 configured to perform various aspects of the palette-based video coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from channel 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units.

According to aspects of this disclosure, entropy decoding unit 150 may be configured to decode palette data using TEGk code, as described above with respect to the example of FIG. 1. In particular, according to aspects of this disclosure, entropy decoding unit 150 may decode data that indicates at least one pixel in a first row of pixels of an encoded block of video data was encoded using Copy mode. In some examples, entropy decoding unit 150 may decode the first-row Copy mode enabled data using TEGk code.

Block decoding unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Block decoding unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Filter unit 160 may perform other filtering operations, including sample adaptive offset (SAO) filtering and/or adaptive loop filtering (ALF). Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform palette-based video coding. Palette-based decoding unit 165, for example, may perform palette-based decoding when a palette-based decoding mode is selected, e.g., for a CU or PU. For example, palette-based decoding unit 165 may be configured to generate a palette having entries indicating pixel values, receive information associating at least some pixel locations in a block of video data with entries in the palette, select pixel values in the palette based on the information, and reconstruct pixel values of the block based on the selected pixel values in the palette. Although various functions are described as being performed by palette-based decoding unit 165, some or all of such functions may be performed by other processing units, or a combination of different processing units.

Palette-based decoding unit 165 may receive palette coding mode information, and perform the above operations when the palette coding mode information indicates that the palette coding mode applies to the block. When the palette coding mode information indicates that the palette coding mode does not apply to the block, or when other mode information indicates the use of a different mode, video decoder 30 may decode the block of video data using a non-palette-based video coding mode, e.g., such an HEVC inter-predictive or intra-predictive coding mode. The block of video data may be, for example, a CU or PU generated according to an HEVC coding process.

According to aspects of this disclosure, palette-based decoding unit 165 may be configured to perform any combination of the techniques for palette coding described herein.

In accordance with the techniques of this disclosure palette-based decoding unit 165 may be configured to infer a pixel scan order for a palette mode encoded block of video data. For example, palette-based decoding unit 165 may be configured to infer the pixel scan order for an encoded block of video data without receiving a block-level syntax element having a value representative of the pixel scan order for the encoded block of video data. As another example, palette-based decoding unit 165 may be configured to infer the pixel scan order for an encoded block of video data not based a block-level syntax element having a value representative of the pixel scan order for the encoded block of video data because the block-level syntax element (i) was not transmitted to palette-based decoding unit 165, (ii) is not received by palette-based decoding unit 165, or (iii) is received by palette-based decoding unit 165 but palette-based decoding unit 165 is configured to infer the pixel scan order without reference to the received block-level syntax element.

For example, palette-based decoding unit 165 may be configured to receive a first palette mode encoded block of video data of a picture. Palette-based decoding unit 165 may be configured to infer a pixel scan order for the first palette mode encoded block of video data without receiving a block-level syntax element having a value representative of the pixel scan order for the first palette mode encoded block. In another example, palette-based decoding unit 165 may be configured to infer a pixel scan order for the first palette mode encoded block of video data not based on a block-level syntax element (whether received or not) having a value representative of the pixel scan order for the first palette mode encoded block. Palette-based decoding unit 165 may be configured to decode the first palette mode encoded block of video data using the inferred pixel scan order.

In some examples, palette-based decoding unit 165 may be configured to receive a second palette mode encoded block of video data of the picture. In such examples, palette-based decoding unit 165 may be configured to receive a block-level syntax element having a value representative of a pixel scan order for the second palette mode encoded block of video data. Palette-based decoding unit 165 may be configured to determine the pixel scan order for the second palette mode encoded block of video data based on the received block-level syntax element. Palette-based decoding unit 165 may be configured to decode the second palette mode encoded block of video data using the determined pixel scan order.

As another example, according to aspects of this disclosure, palette-based decoding unit 165 may be configured to decode at least one pixel in a first row of pixels in a palette mode encoded block of video data using Copy mode where no other row of the plurality of rows of pixels is above the first row.

Figure 4:
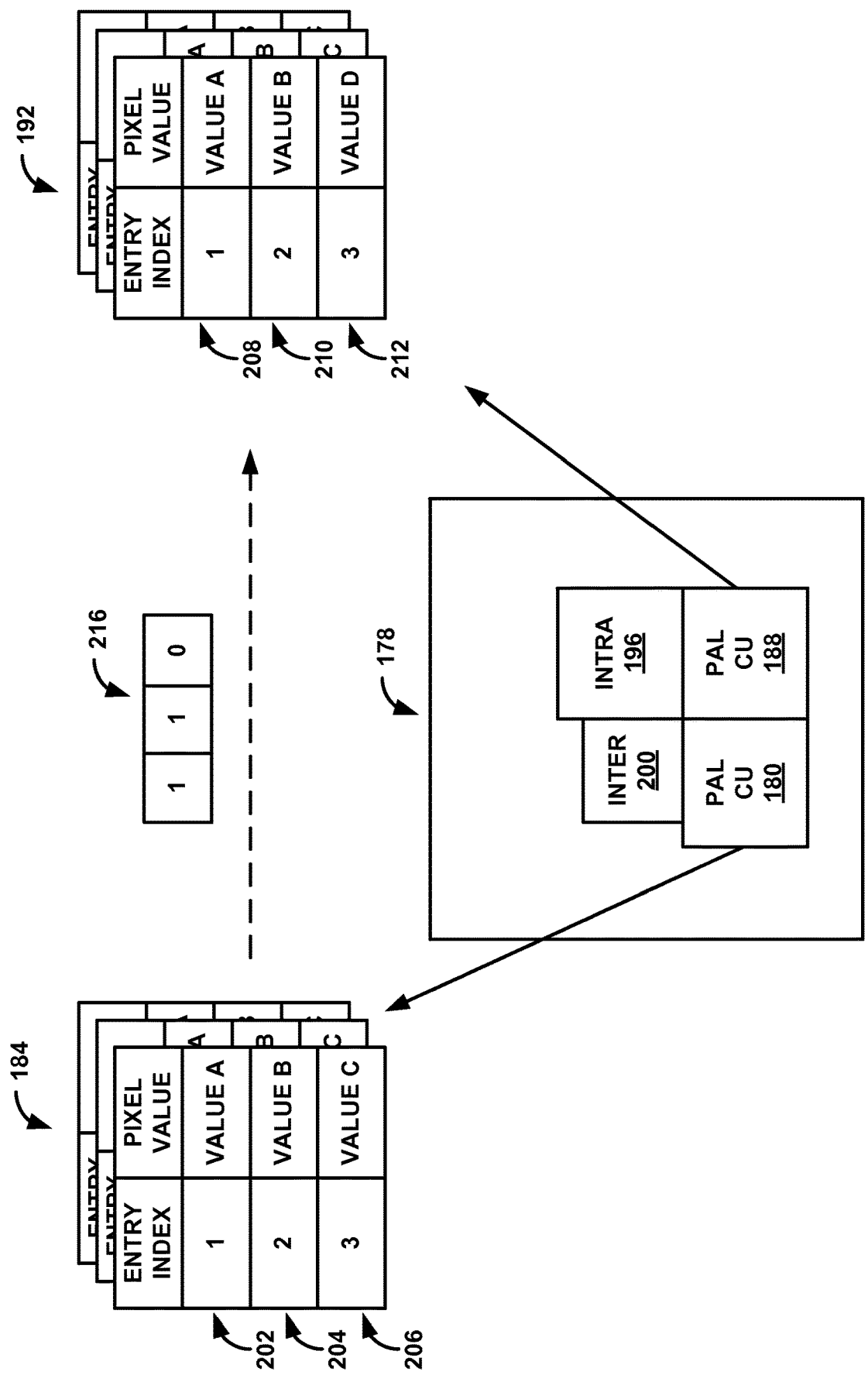
FIG. 4 is a conceptual diagram illustrating an example of determining palette entries for palette-based video coding, consistent with techniques of this disclosure.

FIG. 4 is a conceptual diagram illustrating an example of determining a palette for coding video data, consistent with techniques of this disclosure. The example of FIG. 4 includes a picture 178 having a first palette-coded (PAL) coding unit (CU) 180 that is associated with first palettes 184 and a second PAL CU 188 that is associated with second palettes 192. As described in greater detail below and in accordance with the techniques of this disclosure, second palettes 192 are based on first palettes 184. Picture 178 also includes block 196 coded with an intra-prediction coding mode and block 200 that is coded with an inter-prediction coding mode.

The techniques of FIG. 4 are described in the context of video encoder 20 (FIG. 1 and FIG. 2) and video decoder 30 (FIG. 1 and FIG. 3) and with respect to the HEVC video coding standard for purposes of explanation. However, it should be understood that the techniques of this disclosure are not limited in this way, and may be applied by other video coding processors and/or devices in other video coding processes and/or standards.

In general, a palette refers to a number of pixel values that are dominant and/or representative for a CU currently being coded, CU 188 in the example of FIG. 4. First palettes 184 and second palettes 192 are shown as including multiple palettes. In some examples, according to aspects of this disclosure, a video coder (such as video encoder 20 or video decoder 30) may code palettes separately for each color component of a CU. For example, video encoder 20 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU.

In other examples, video encoder 20 may encode a single palette for all color components of a CU. In this example, video encoder 20 may encode a palette having an i-th entry that is a triple value, including Yi, Ui, and Vi. In this case, the palette includes values for each of the components of the pixels. Accordingly, the representation of palettes 184 and 192 as a set of palettes having multiple individual palettes is merely one example and not intended to be limiting.

In the example of FIG. 4, first palettes 184 includes three entries 202-206 having entry index value 1, entry index value 2, and entry index value 3, respectively. Entries 202-206 relate the index values to pixel values including pixel value A, pixel value B, and pixel value C, respectively. As described herein, rather than coding the actual pixel values of first CU 180, a video coder (such as video encoder 20 or video decoder 30) may use palette-based video coding to code the pixels of the block using the indices 1-3. That is, for each pixel position of first CU 180, video encoder 20 may encode an index value for the pixel, where the index value is associated with a pixel value in one or more of first palettes 184. Video decoder 30 may obtain the index values from a bitstream and reconstruct the pixel values using the index values and one or more of first palettes 184. Thus, first palettes 184 are transmitted by video encoder 20 in an encoded video data bitstream for use by video decoder 30 in palette-based decoding.

In some examples, video encoder 20 and video decoder 30 may determine second palettes 192 based on first palettes 184. For example, video encoder 20 and/or video decoder 30 may locate one or more blocks from which the predictive palettes, in this example, first palettes 184, are determined. The combination of entries being used for purposes of prediction may be referred to as a predictor palette.

In the example of FIG. 4, second palettes 192 include three entries 208-212 having entry index value 1, entry index value 2, and entry index value 3, respectively. Entries 208-212 relate the index values to pixel values including pixel value A, pixel value B, and pixel value D, respectively. In this example, video encoder 20 may code one or more syntax elements indicating which entries of first palettes 184 (representing a predictor palette, although the predictor palette may include entries of a number of blocks) are included in second palettes 192.

In the example of FIG. 4, the one or more syntax elements are illustrated as a vector 216. Vector 216 has a number of associated bins (or bits), with each bin indicating whether the predictor palette associated with that bin is used to predict an entry of the current palette. For example, vector 216 indicates that the first two entries of first palettes 184 (202 and 204) are included in second palettes 192 (a value of "1" in vector 216), while the third entry of first palettes 184 is not included in second palettes 192 (a value of "0" in vector 216). In the example of FIG. 4, the vector is a Boolean vector. The vector may be referred to as a palette prediction vector.

In some examples, as noted herein, video encoder 20 and video decoder 30 may determine a predictor palette (which may also be referred to as a predictor palette table or predictor palette list) when performing palette prediction. The predictor palette may include entries from palettes of one or more neighboring blocks that are used to predict one or more entries of a palette for coding a current block. Video encoder 20 and video decoder 30 may construct the list in the same manner. Video encoder 20 and video decoder 30 may code data (such as vector 216) to indicate which entries of the predictor palette are to be copied to a palette for coding a current block.

Thus, in some examples, previously decoded palette entries are stored in a list for use as a palette predictor. This list may be used to predict palette entries in the current palette mode CU. A binary prediction vector may be signaled in the bitstream to indicate which entries in the list are re-used in the current palette. In U.S. Provisional Application No. 62/018,461, filed Jun. 27, 2014, run length coding is used to compress the binary palate predictor. In an example, the run-length value is coded using 0th order Exponential-Golomb code.

According to aspects of this disclosure, in some examples, video encoder 20 and video decoder 30 (e.g., entropy encoding unit 118 and entropy decoding unit 150) may be configured to code (e.g., encode and decode, respectively) a binary palette prediction vector for a palette of a block using a kth order truncated Exponential-Golomb (TEGk) code, as described above with respect to the example of FIG. 1.

In some instances, video encoder 20 and video decoder 30 may be configured to code the binary palette prediction vector using the TEGk code in conjunction with the techniques described in standard submission document Seregin et al., "Non-SCCE3: Run-Length Coding for Palette Predictor," JCTVC-R0228, Sapporo, J P, 30 Jun.-9 Jul. 2014 (hereinafter JCTVC-R0228). In JCTVC-R0228, run-length coding is used to code the zero elements in a binary vector with the following conditions and steps:

Run-length value equal to 1 indicates end of prediction

The end of prediction is not signaled for the last 1 in the binary vector

The number of preceding zero elements is coded for every 1 in the binary vector

If the number of zero elements is greater than 0, the number plus one is signaled, due to the escape value of 1

Run-length value is coded using 0-order Exponential Golomb code

In an example for purposes of illustration, a binary palette prediction vector may be equal to {1100100010000}, indicating that four entries (indicated by the four ones) of the palette predictor are copied to the palette for coding a current block. In this example, video encoder 20 and video decoder 30 may code the vector as 0-0-3-4-1.

According to aspects of this disclosure, video encoder 20 and video decoder 30 may code the binary palette prediction vector using a maximal run value X for the vector, which may be equal to the number of palette entries in the palette predictor list minus current position in scanning order minus one). According to one example, video encoder 20 and video decoder 30 use a TEGO code for coding the run value.

Figure 5:
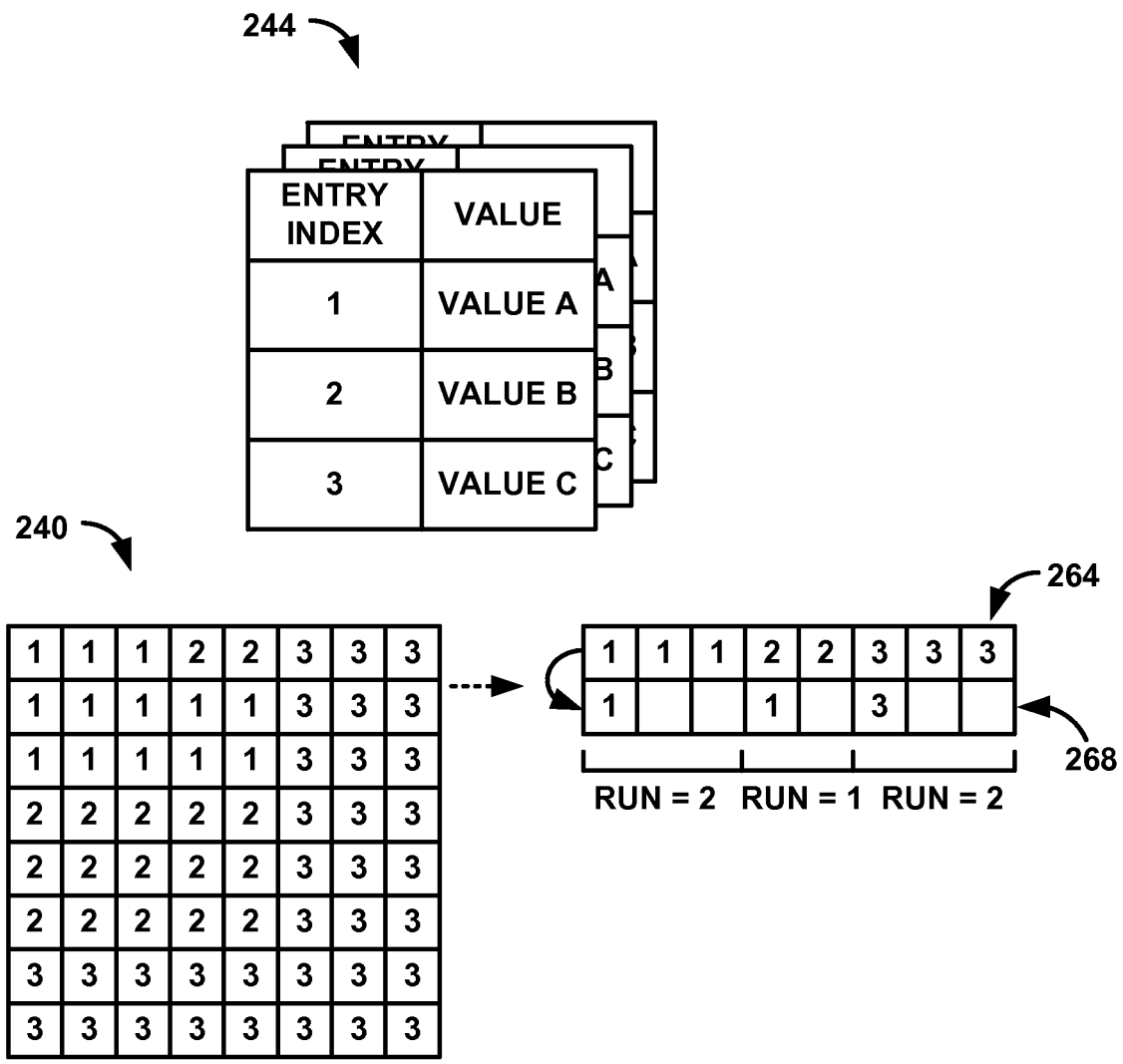
FIG. 5 is a conceptual diagram illustrating an example of determining indices to a palette for a block of pixels, consistent with techniques of this disclosure.

FIG. 5 is a conceptual diagram illustrating an example of determining indices to a palette for a block of pixels, consistent with techniques of this disclosure. For example, FIG. 5 includes a map 240 of palette indices that relate respective positions of pixels associated with the palette indices to an entry of palettes 244.

For example, index 1 is associated with Value A, index 2 is associated with Value B, and index 3 is associated with Value C. In addition, when escape samples are indicated using implicit escape signaling, video encoder 20 and video decoder 30 may also add an additional index to palettes 244, illustrated in FIG. 5 as index 4, which may indicate that samples of map 240 associated with index 4 are escape samples. In this case, video encoder 20 may encode (and video decoder 30 may obtain, from an encoded bitstream) an indication of an actual pixel value (or its quantized version) for a position in map 240 if the pixel value is not included in palettes 244.

In some examples, video encoder 20 and video decoder 30 may be configured to code an additional map indicating which pixel positions are associated palette indices. For example, assume that the (i, j) entry in the map corresponds to the (i, j) position of a CU. Video encoder 20 may encode one or more syntax elements for each entry of the map (i.e., each pixel position) indicating whether the entry has an associated index value. For example, video encoder 20 may encode a flag having a value of one to indicate that the pixel value at the (i, j) location in the CU is one of the values in palettes 244.

Video encoder 20 may, in such an example, also encode a palette index (shown in the example of FIG. 5 as values 1-3) to indicate that pixel value in the palette and to allow video decoder to reconstruct the pixel value. In instances in which palettes 244 include a single entry and associated pixel value, video encoder 20 may skip the signaling of the index value. Video encoder 20 may encode the flag to have a value of zero to indicate that the pixel value at the (i, j) location in the CU is not one of the values in palettes 244. In this example, video encoder 20 may also encode an indication of the pixel value for use by video decoder 30 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 20 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 30 may obtain the syntax elements indicating a run from an encoded bitstream and use the data to determine the number of consecutive locations that have the same pixel or index value.

As noted above, runs may be used in conjunction with a CopyFromTop or Value mode. In an example for purposes of illustration, consider rows 264 and 268 of map 240. Assuming a horizontal, left to right scan direction, row 264 includes three palette indices of "1," two palette indices of "2," and three palette indices of "3." Row 268 includes five palette indices of "1," two palette indices of "3," and one sample that is not included in palettes 244 (represented by index 4, although a sample-level escape flag may be used for explicit escape signaling), which may be referred to as an escape sample.

In this example, video encoder 20 may use CopyFromTop mode to encode data for row 268. For example, video encoder 20 may encode one or more syntax elements indicating that the first position of row 268 (the left most position of row 268) is the same as the first position of row 264. Video encoder 20 may also encode one or more syntax elements indicating that the next run of two consecutive entries in the scan direction in row 268 are the same as the first position of row 264.

After encoding the one or more syntax elements indicating the first position of row 264 and the run of two entries (noted above), video encoder 20 may encode the fourth and fifth positions in row 268 (from left to right), using Value mode. For example, video encoder 20 may encode one or more syntax elements indicating a value of 1 for the fourth position and one or more syntax elements indicating a run of 1 (e.g., Value mode). Hence, video encoder 20 encodes these two positions without reference to another line.

Video encoder 20 may then encode the first position having an index value of 3 in row 268 using CopyFromTop mode relative to upper row 264. For example, video encoder 20 may signal a CopyFromTop mode and a run of 1. Accordingly, video encoder 20 may select between coding pixel values or palette indices of a line relative to other values of the line, e.g., using a run, coding pixel values or of a line relative to values of another line (or column), or a combination thereof. Video encoder 20 may, in some examples, perform a rate/distortion optimization to make the selection.

Video encoder 20 may then encode the escape sample for the final sample of row 268 according to a scan order (e.g., from left to right), which is not included in first palettes 244. For example, video encoder 20 may encode the final position of row 268 as an escape sample. That is, video encoder 20 may encode an indication that the final position of row 268 is an escape sample (e.g., index 4), as well as an indication of the sample value. Video decoder 30 may obtain the above-described syntax from an encoded bitstream and reconstruct row 268 using such syntax.

Video decoder 30 may receive the syntax elements described above and reconstruct row 268. For example, video decoder 30 may obtain data indicating a particular location in a neighboring row from which to copy the associated index value for the position of map 240 currently being coded. Video decoder 30 may also obtain data indicating the number of consecutive positions in the scan order having the same index value. While described with respect to a horizontal scan order, the techniques of this disclosure may also be applied to another scan order or scan direction, such as a vertical or diagonal (e.g., 45 degrees or 135 degrees diagonally in block) scan order or scan direction.

The techniques of this disclosure, as will be described in more detail below, are related to palette-based video coding design, including a palette size definition. The techniques of this disclosure may be used in conjunction with screen content coding and other extensions to the HEVC, as well as with other video codecs that utilize screen content coding.

In one example of HEVC palette coding, pixels of a block may be coded with one of a Run mode, Copy mode or Escape mode, excepting the very first row of the block when only Run mode or Escape modes are used. A syntax element palette_run_type_flag may be generated to indicate whether Run mode or Copy mode is used. In the run mode, a palette index (palette_index) is signaled along with a run value (palette_run). The run value indicates the number of pixels that will have the same palette index. In the Copy mode, only a run value is signaled indicating the number of pixels for which the palette index is copied from the pixels located directly above the current pixel. Escape mode is coded within the Run mode where a specific palette index is used to indicate this mode. In one palette coding mode proposal, the specific palette index is equal to the palette size. In the Escape mode, the run value is not coded since the Escape mode is applied to single a pixel triplet (e.g., Y, Cr, and Cb color components of a pixel) where the values of the color components are explicitly signaled using the syntax element palette_escape_val.

A flag (e.g., palette_escape_val_present_flag) may be signaled per block to indicate the usage of the escape pixels. The palette_escape_val_present_flag equal to 1 indicates that there is at least one escape pixel in the palette coded block, and the palette_escape_val_present_flag is equal to 0 otherwise.

The number of values in a palette (i.e., the palette size) may be set to one of several values, and may have a predetermined maximum size. For example, in one proposal for palette coding in HEVC, the palette size is restricted to be in the range of 0 to max_palette_size (equal to 31, in one example).

For blocks coded with a palette coding mode, the values in the palette may be predicted from palette entries of a palette used for previously palette coded blocks. In some examples, the entries of a palette may be explicitly signaled as new entries. In other examples, entries from the palette of a previously coded block may be reused for subsequent pallets. This case is called palette sharing, and a flag (e.g., palette_share_flag) may be signaled to indicate that the entire palette of the previous block is reused without modification.

Figure 6A:
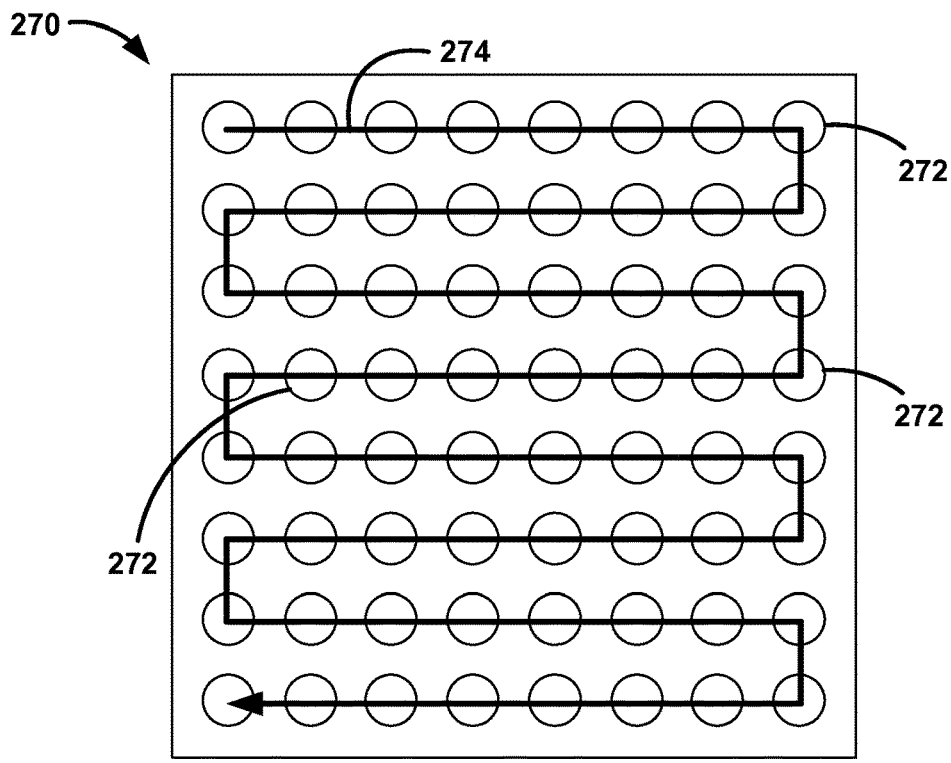
FIG. 6A is a conceptual diagram illustrating one example of a pixel scanning order.
Figure 6B:
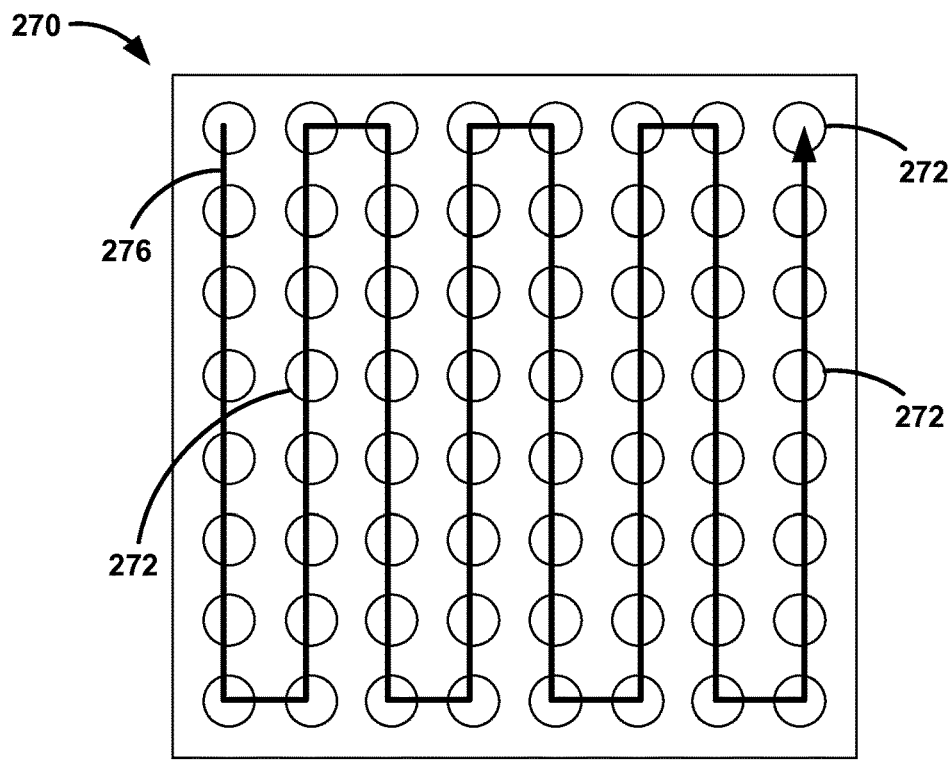
FIG. 6B is a conceptual diagram illustrating one example of a pixel scanning order.

In some proposals for palette coding mode, the pixel scanning in the block can be of two types: vertical traverse or horizontal traverse (e.g., snake-like) scanning One example of a horizontal scanning order is shown in FIG. 6A, which shows a block of video data 270 depicted with an array of pixels 272, and a horizontal scanning order 274. One example of a vertical scanning order is shown in FIG. 6B, which shows a block of video data 270 depicted with an array of pixels 272, and a vertical scanning order 276. The scanning pattern used for a particular block may be derived from a flag (e.g., palette_transpose_flag) that is signaled per block unit.

Current palette coding designs exhibit the following drawbacks. As one example drawback, in some proposals for palette coding, the maximum palette size in the block may be equal to 31, meaning that the largest palette index can be equal to 30, and an escape pixel is signaled with the palette index equal to 31. In other words, the effective palette index that can be signaled can be equal to the 31, which corresponds to a maximum palette size of 32. However, if the palette_escape_val_present_flag indicates that there are no escape pixels in the block, the maximum palette index that can be coded is still 30, and the palette index equal to 31 is not used in this case. Similarly, when palette sharing is used, up to palette index equal to 30 can be used regardless of the presence of escape pixels in the current block.

As another drawback, in some proposals for palette coding, a palette size equal to 0 may be used. In this case, pixels may only be coded with Escape mode. As a result, the palette_escape_val_present_flag has to be always be signaled with a value equal to 1, and cannot have a 0 value.

As another drawback, in some proposals for palette coding, if the palette size is equal to 0, the only possible pixel mode is Escape mode. In this case, the scanning mode in which pixels are processed does not have any impact (i.e., vertical traverse and horizontal traverse scanning will produce the same result). However, the flag to indicate the scanning mode is still signaled. Similarly, when the palette size is equal to 1 and no escape pixels are used, the only possible mode is the Run mode with a palette index equal to 0. The scanning order used does not have any impact in this situation as well.

As another drawback, in some proposals for palette coding, the pixel mode signaling is not uniformly signaled in the block. This is because, for the very first row of the block, the mode cannot be a Copy mode. As such, for the first row of the block, mode index is derived to be equal to the Run mode (or Escape mode for the specific palette index value). This derivation process introduces a check during parsing since, in some cases, the mode value is not parsed but derived.

As another drawback, in some proposals for the Copy mode for palette coding, an above pixel (i.e., the pixel directly above the currently coded pixel) coded with the Escape mode can be included into the run value of the Copy mode. However, the copying process is not defined for escape coded pixels, since those pixels include two pieces of information (i.e., the palette index and the escape value). If video encoder 20 were to just copy the palette index from the above pixel (which is a specific palette index representing an escape mode) as it is done in Copy mode, the escape values for the current pixels are not defined or signaled. This may create an issue in the parsing, since when video decoder 30 attempts to decode an escape pixel, the escape color values that would be expected to be signaled are not present.

As another drawback, in some proposals for palette coding, there are two general methods to derive the palette for the current block. One method involves completely reusing the palette from the previous palette coded block (palette sharing) where new entries cannot be signaled. The second method involves signaling a palette predictor binary vector. The palette predictor binary vector includes an indication of a palette entry of the previous palette coded block along with the new palette entries. In current proposals, it is not possible to do something in between those two palette derivation methods, i.e. to reuse completely the palette of the previous palette coded block without signaling a palette predictor vector, but still additionally signal new palette entries. As such, current proposals lack flexibility.

In view of the aforementioned drawbacks, this disclosure proposes methods and techniques of palette coding design, including a palette size definition.

In one example of the disclosure, an improved palette size definition is proposed. In this example, the palette size is defined such that the maximum possible index for the palette includes the index representing the escape pixel. With reference to the above example for current palette coding techniques, when the maximum palette size is 31, the maximum palette index is 31 for the escape pixel. This disclosure proposes to make the maximum palette size equal to 32 and the maximum possible signaled palette index value to be 31. Or more generally, the maximum possible signaled palette index value is one less than the maximum palette size.

In an example of this disclosure, when escape pixels are not used in the current block (e.g., as indicated by the palette_escape_val_present_flag flag), the former palette index equal to 31, which is vacant in this example, can be used in the Run mode. The palette_escape_val_present_flag syntax element may be defined by one or more bits. In examples, where the palette_escape_val_present_flag flag is a single bit, a value equal to 1 may specify that the current block may contain or actually contains an escape pixel. A value equal to 0 may specify that the current block may not contain or actually does not contain an escape pixel.

The Escape mode indication can be kept unchanged, i.e., the Escape mode indication would be a maximum palette index equal up to a value of 31 (i.e., a value of 0 to 31) and the palette index in the Run mode can be equal up to 30 (i.e., a value of 0 to 30). In other words, it can be seen that no extra palette index within the palette of palette size is reserved for the escape coded pixel.

In a more general sense, the maximum palette index used in the Run mode can be palette_size−1 if there is no escape coded pixel in the block, and palette_size−2 if there is at least one escape coded pixel in the block which can be indicated, for example, by the palette index equal to the palette_size−1.

In this case, the palette size is always greater than 0, and the palette size derived as a sum of the number of the reused palette entries and the number of the signaled new palette entries is increased by 1 if the palette size is not equal to the max_palette_size.

Additionally, when palette sharing is used and a palette index within the palette of palette size is unavailable or otherwise not reserved for the escape pixel, the palette size cannot be simply extended by 1, since there is the possibility that the palette size is already equal to max_palette_size. In this example, video encoder 20 and/or video decoder 30 may perform a check for the palette size, and if the palette size of the shared palette is smaller than max_palette_size, video encoder 20 and/or video decoder 30 may alter or change the palette size of the current block based on palette_escape_val_present_flag. For example video encoder 20 and/or video decoder 30 increase the palette size of the current block by 1 if escape pixels are used in the block (e.g., as indicated by palette_escape_val_present_flag). However, video encoder 20 and/or video decoder 30 may determine that palette size is already equal to the max_palette_size and may, in response, alter or change the palette size of the current block. For example, video encoder 20 and/or video decoder 30 may reduce the palette size of the current block by 1 before increasing it by 1 for an escape pixel. In this example, video encoder 20 and/or video decoder 30 may set the reused palette predictor flag to 0 for the last entry which is related to the palette index equal to the max_palette_size minus 1.

In another example, if palette sharing is not used and the palette size is equal to the max_palette_size, then escape pixels cannot be coded in the block and video encoder 20 may signal palette_escape_val_present_flag with a value equal to 0. Video encoder 20 may conditionally signal palette_escape_val_present_flag with a corresponding value (e.g., 0 or 1) depending on the palette size. In another example, video encoder 20 may conditionally signal palette_escape_val_present_flag with a corresponding value (e.g., 0 or 1) depending on the palette sharing mode and if the palette size of the current block is equal to max_palette_size. In another example, when it is desired to enable escape pixel signaling when the palette size is equal to the max_palette_size with enabled palette sharing, if palette sharing is not used, then video encoder 20 may not signal palette_escape val_present_flag and video decoder 30 may derive the value of palette_escape_val_present_flag to be equal to 0. In other examples, video decoder 30 may derive the value of palette_escape_val_present_flag to be equal to 1 when palette_escape_val_present_flag is not signaled by video encoder 20.

The following section discusses techniques for deriving the value of palette_escape_val_present_flag. Based on a palette size equal to 0, video encoder 20 may determine that only pixels coded in the Escape mode can be used in the current block. In this example, video encoder may or always signal palette_escape_val_present_flag with a value equal to 1. Video encoder 20 may not signal or always not signal palette_escape_val_present_flag because the value of palette_escape_val_present_flag is constant in this example. Instead, video decoder 30 may be configured to infer the value of palette_escape_val_present_flag to be equal to 1. In other examples, video decoder 30 may be configured to infer the value of palette_escape_val_present_flag to be equal to 0.

Video encoder 20 may conditionally signal palette_escape_val_present_flag with a corresponding value based on the palette size of the current block of video data. For example, video encoder 20 may not signal palette_escape_val_present_flag in response to video encoder 20 determining that the palette size is equal to 0. As another example, video encoder 20 may be configured to not signal a palette index since the palette index can be also be derived equal to 0. In this case, palette mode is similar to the intra PCM mode. However, video encoder 20 may be configured to signal runs for the escape values in this case, to make it different from PCM and capture some signal redundancies.

For example, this method can be implemented as follows relative to the SCC WD with additions represented by underlined text.

| if ( palette__size > 0 ) | |
|---|---|
|    palette__escape__val__present__flag | ae(v) | palette_escape_val_present_flag equal to 1 specifies that the current block may contain escape pixel. escape_val_present_ flag equal to 0 specifies that there is no escape pixel in the current block. If palette_escape_val_present_flag is not present it is inferred equal to 1.

In another example, the techniques of this disclosure may be implemented as a normative constraint on the syntax element as follows with additions to the SCC WD represented by underlined text:
palette_escape_val_present_flag equal to 1 specifies that the current block may contain escape pixel. escape_val_present_ flag equal to 0 specifies that there is no escape pixel in the current block. palette_escape_val_present_flag shall be equal to 1 if palette_size is equal 1.

If this rule is broken then such a bistream is considered to be non-conformant to the standard.

The methods described above for palette size definition and palette_escape_val_present_flag derivation may be combined together with the following implementation, provided as an example with additions to the SCC WD represented by underlined text.

```
palette_share_flag[ x0 ][ y0 ]                                  ae(v)
...
palette_size = numPredPreviousPalette +
palette_num_signalled_entries
...
if ( palette_size == 0)
    palette_escape_val_present_flag = 1
else if ( (!palette_share_flag&& palette_size <
max_palette_size) || palette_share_flag )
    palette_escape_val_present_flag                             ae(v)
else
    palette_escape_val_present_flag= 0
if( palette_escape_val_present_flag && palette_size <
max_palette_size)
    palette_size++
...
indexMax= palette_size− 1
```

Conditions in italics above may be removed if the escape pixels cannot be included in the palette mode with palette size equal to the max_palette_size when palette sharing is enabled. The variable indexMax indicates the maximum possible palette index, and it can be unconditionally set as palette_size−1 comparing to the conditional adjustment based on palette_escape_val_present_flag in the SCC WD.

This section of the disclosure describes scanning order signaling. In accordance with some examples of this disclosure, scanning order signaling (or scan order signaling) for a current block of video data of a picture (e.g., the current CU, PU, or sub-PU) is not required when the palette size of the current block of video data is equal to 0, or palette size is equal to 1 and escape pixels are not used in the block, since the only possible pixel mode is Escape mode or Run mode, respectively.

This disclosure proposes that video encoder 20 signal the scanning order flag only for the cases it may have an impact (i.e., when different scanning orders produce different results), for example, when the palette size is greater than 0 and escape pixels are used or the palette size is greater than 1 if escape pixels are not used.

As two examples, this method can be implemented as follows relative to the SCC WD with additions represented by underlined text:

```
if( (palette_size> 0 && palette_escape_val_present_flag) ||
   (palette_size> 1 && !palette_escape_val_present_flag) )
    palette_transpose_flag                                      ae(v)
``` or

```
if( palette_size> (1 − palette_escape_val_present_flag) )
    palette_transpose_flag                                      ae(v)
``` palette_transpose_flag equal to 1 specifies the transpose process is applied to the associated palette indices of the current CU (e.g., current block of video data of a picture being encoded or decoded). palette_transpose_flag equal to 0 specifies the transpose process is not applied to the associated palette indices of the current CU. If palette_transpose_flag is not present it is inferred equal to 0.

Instead of video decoder 30 inferring that the value of palette_transpose_flag is equal to 0 if not present, other predefined scanning orders may be used in other examples. This method can be also extended to more than two scanning patterns.

In one example of the techniques of this disclosure for signaling scanning orders, video encoder 20 has to signal the value of palette_escape_val_present_flag before signaling the value of palette_transpose_flag.

In another example, video encoder may determine that the palette size of the current block of video data is equal to 0, and, as a result, video encoder 20 may code each pixel as an escape pixel. From the encoder rate-distortion optimization's perspective, this case is less likely to be chosen. Therefore, it is proposed to put a restriction to the palette mode that if palette mode is selected, palette size must be greater than or equal to 1.

Based on this bitstream restriction, the semantics of the palette_num_signalled_entries syntax element is as follows with additions to the SCC WD represented by underlined text:

```
if( numPredPreviousPalette < max_palette_size)
    palette_num_signalled_entries                               ae(v)
``` palette_num_signalled_entries specifies the number of entries in the palette that are explicitly signaled for the current coding unit if numPredPreviousPalette is greater than 0. palette_num_signalled_entries specifies the number of entries minus 1 in the palette that are explicitly signaled for the current coding unit if numPredPreviousPalette is equal to 0.

In another example of the disclosure, instead of changing the semantics for the syntax element palette_num_signalled_entries when the value of numPredPreviousPalette is equal to 0, only a valid range of values for the syntax element palette_num_signalled_entries is changed as follows with changes relative to the SCC WD represented by underlined text:
palette_num_signalled_entries specifies the number of entries in the palette that are explicitly signalled for the current coding unit. The value of palette_num_signalled_entries is restricted as follows: If numPredPreviousPalette is greater than 0, palette_num_signalled_entries shall be in the range of 0 to (max_palette_size−numPredPreviousPalette), inclusive. Otherwise (i.e., if numPredPreviousPalette is equal to 0), palette_num_signalled_entries shall be in the range of 1 to max_palette_size, inclusive.

Figure 7:
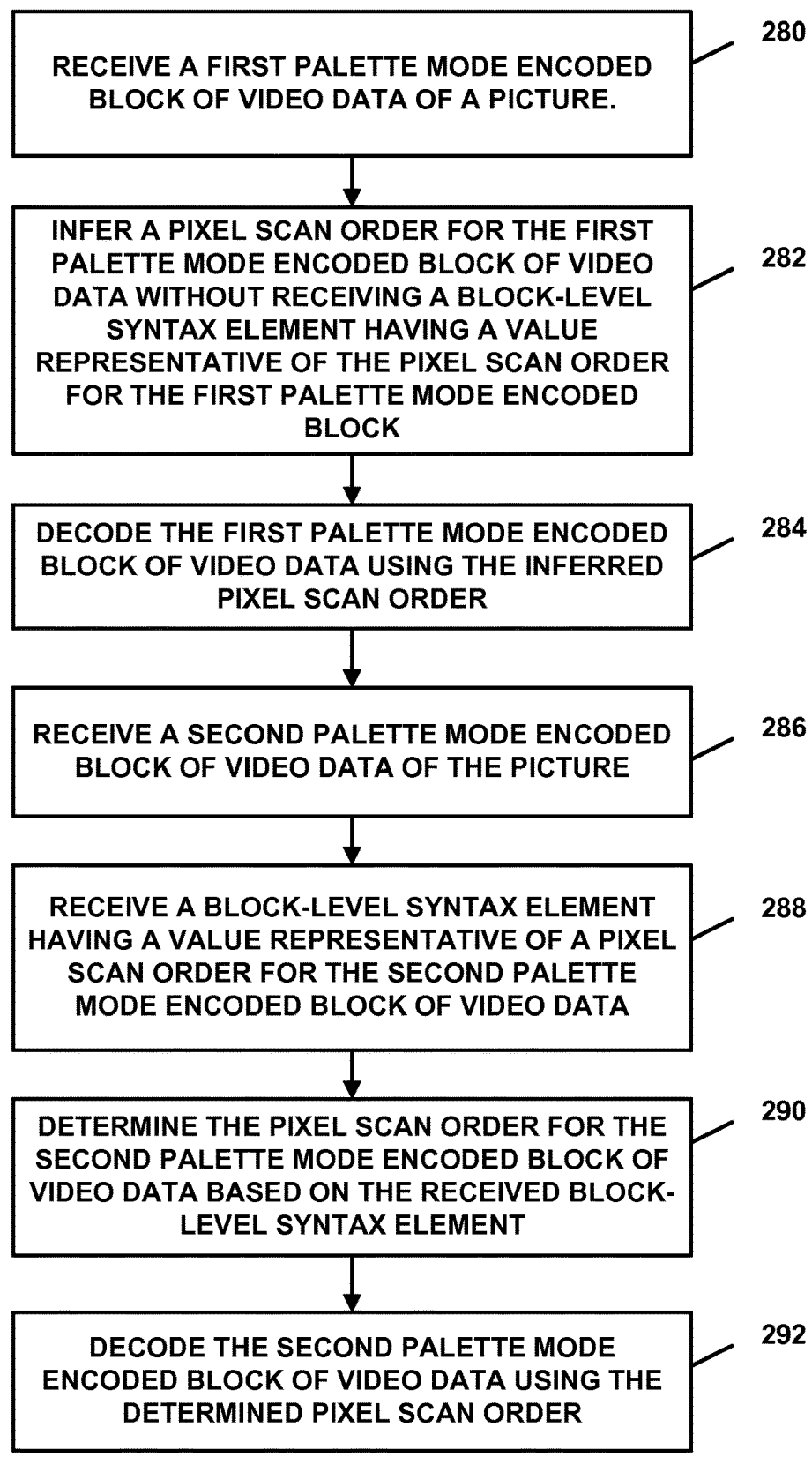
FIG. 7 is a flowchart illustrating an example process for decoding video data consistent with techniques for palette-based video coding of this disclosure.

FIG. 7 is a flowchart illustrating an example process for decoding video data consistent with techniques of this disclosure. The process of FIG. 7 is generally described as being performed by video decoder 30 for purposes of illustration, although a variety of other processors may also carry out the process shown in FIG. 7. In some examples, block decoding unit 152 and/or palette-based decoding unit 165 may perform one or more processes shown in FIG. 7.

In the example of FIG. 7, video decoder 30 may receive (280) a first palette mode encoded block of video data of a picture. Video decoder 30 may infer (282) a pixel scan order for the first palette mode encoded block of video data without receiving a block-level syntax element having a value representative of the pixel scan order for the first palette mode encoded block. In some examples, the block-level syntax element not received by video decoder 30 may be palette_transpose_flag. Video decoder 30 may decode (284) the first palette mode encoded block of video data using the inferred pixel scan order.

In some examples, video decoder 30 may infer the pixel scan order for the first palette mode encoded block of video data by inferring the value of the first block-level syntax element for the first palette mode encoded block such that a transpose process is to be applied or is not to be applied to palette indices associated with the first palette mode encoded block of video data to decode the first palette mode encoded block of video data. In examples where the transpose process is to be applied to palette indices associated with the first palette mode encoded block of video data, the inferred value of the block-level syntax element may be one. In examples where the transpose process is not to be applied to palette indices associated with the first palette mode encoded block of video data, the inferred value of the block-level syntax element may be zero. In some examples, video decoder 30 may infer the pixel scan order for the first palette mode encoded block of video data by inferring the value of the block-level syntax element such that the pixel scan order for the first palette mode encoded block of video data is inferred to be a non-horizontal or non-vertical pixel scan order.

In some examples, video decoder 30 may infer the pixel scan order for the first palette mode encoded block of video data based on a palette size of the first palette mode encoded block of video data equaling a value of zero, equaling a value of one, being greater than a value of zero, or being greater than a value of one.

Video decoder 30 may receive (286) a second palette mode encoded block of video data of the picture. Video decoder 30 may receive (288) a block-level syntax element having a value representative of a pixel scan order for the second palette mode encoded block of video data. In some examples, the received block-level syntax element may be palette_transpose_flag. Video decoder 30 may determine (290) the pixel scan order for the second palette mode encoded block of video data based on the received block-level syntax element. Video decoder 30 may decode (292) the second palette mode encoded block of video data using the determined pixel scan order.

Figure 8:
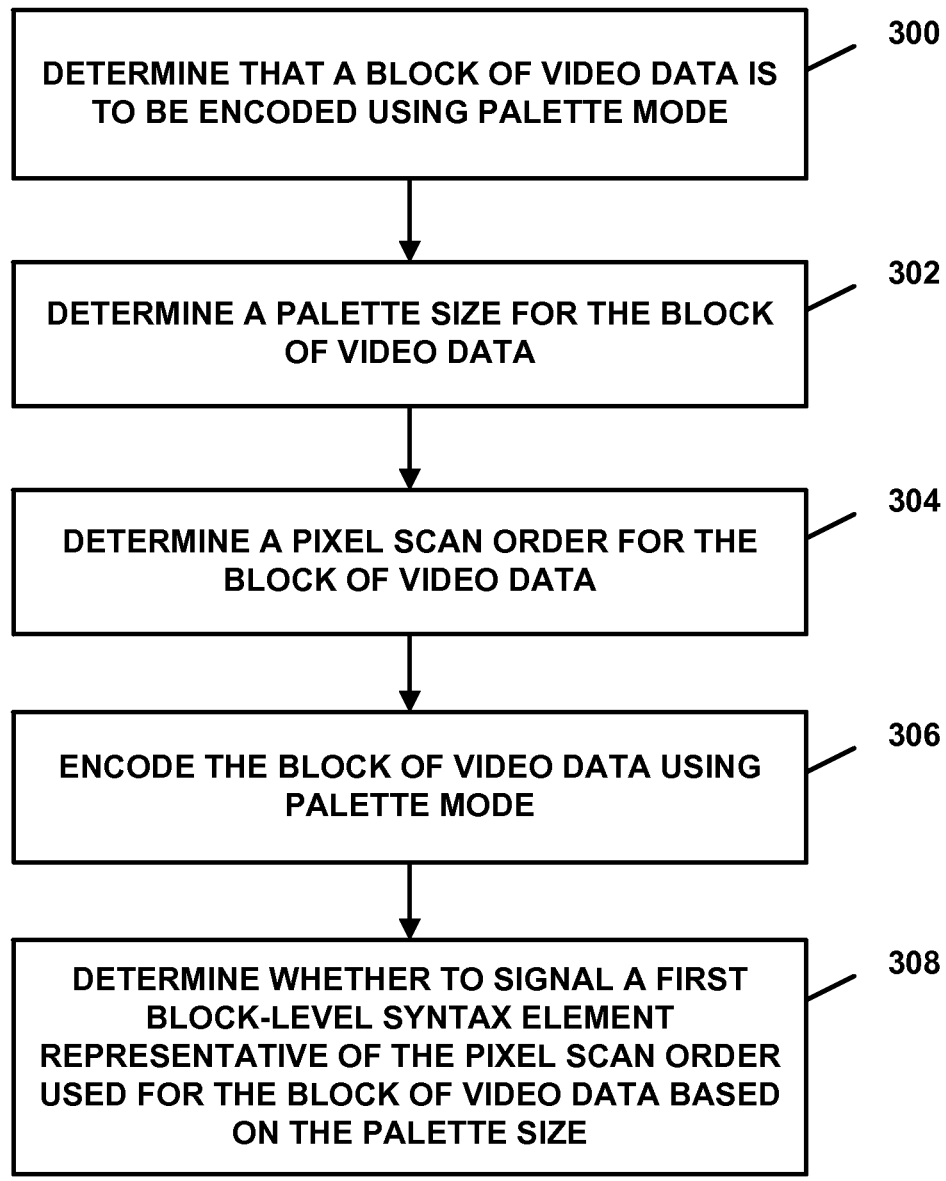
FIG. 8 is a flowchart illustrating an example process for encoding video data consistent with techniques for palette-based video coding of this disclosure.

FIG. 8 is a flowchart illustrating an example process for encoding video data consistent with techniques of this disclosure. The process of FIG. 8 is generally described as being performed by video encoder 20 for purposes of illustration, although a variety of other processors may also carry out the process shown in FIG. 7. In some examples, block encoding unit 100 and/or palette-based encoding unit 122 may perform one or more processes shown in FIG. 8.

In the example of FIG. 8, video encoder 20 may determine (300) that a block of video data is to be encoded using palette mode. Video encoder 20 may determine (302) a palette size for the block of video data. Video encoder 20 may determine (304) a pixel scan order for the block of video data. Video encoder 20 may encode (306) the block of video data using palette mode. Video encoder 20 may determine (308) whether to signal a first block-level syntax element representative of the pixel scan order used for the block of video data based on the palette size. In some examples, the first block-level syntax element may be palette_transpose_flag.

In some examples, determining whether to signal the first block-level syntax element may be based on the palette size equaling a value of zero, equaling a value of one, being greater than a value of zero, or being greater than a value of one. In other examples, determining whether to signal the first block-level syntax element may be based on whether the palette encoded block of video data includes at least one escape pixel. In other examples, determining whether to signal the first block-level syntax element may be based on a value of a second block-level syntax element representative of whether the palette encoded block of video data includes at least one escape pixel.

In some examples, the method shown in the example of FIG. 8 may include not signaling the first block-level syntax element when the palette size is equal to a value of zero. In another example, the first block-level syntax element may not be signaled when the palette size is equal to a value of one and the palette encoded block of video data does not include at least one escape pixel. In another example, the first block-level syntax element may not be signaled when the palette size is equal to a value of one and the value of a second block-level syntax element is representative that that the palette encoded block of video data does not include at least one escape pixel.

Figure 9:
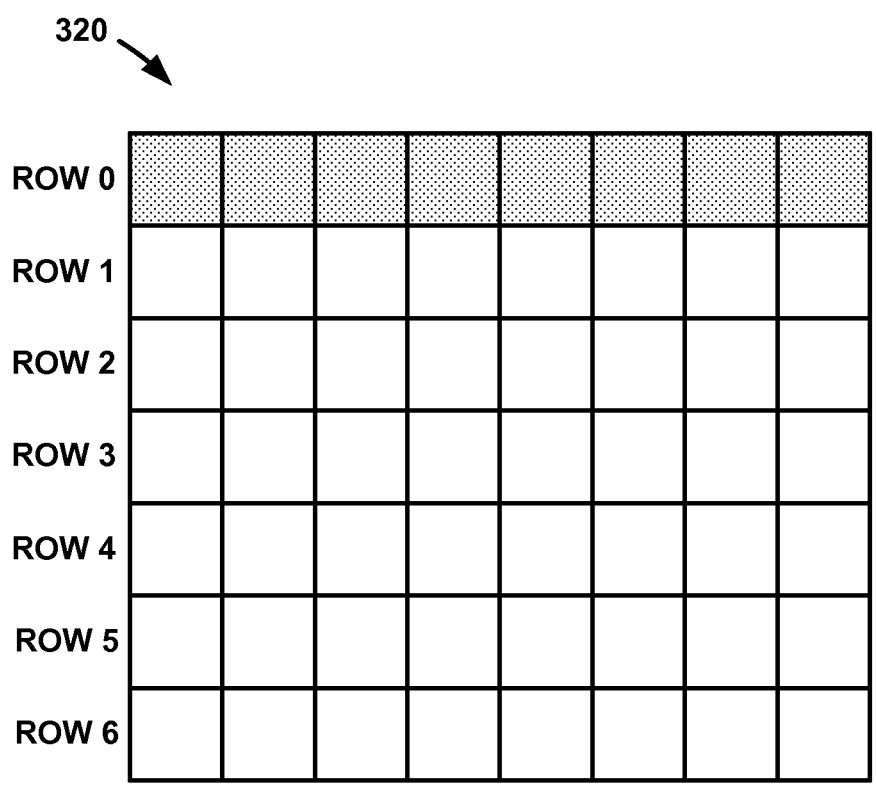
FIG. 9 is a conceptual diagram illustrating an example of enabling Copy mode for the first row of a block of video data consistent with techniques for palette-based video coding of this disclosure.

FIG. 9 is a conceptual diagram illustrating an example of enabling Copy mode for the first row of a block of video data. In current proposals for palette coding, Copy mode is not used for the very first row in the block since there are no pixels directly above the first row located inside the current block. Therefore, Copy mode is not signaled for the first row and Run mode is derived under the current proposals for palette coding. This introduces a check during parsing since the pixel mode sometimes is not signaled, but derived.

In example techniques of this disclosure, video encoder 20 may enable Copy mode for the very first row of pixels in the current block of video data (e.g., depicted as row 0 in current block of video data 320) of a picture by setting the palette index equal to a default palette index for pixels coded with Copy mode in the first row. While current block of video data 320 is shown as an 8×8 block, the current block of video data 320 may be any other size in other examples. Regarding the very first row, it is understood that no other row of the block of video data 320, which contains a plurality of rows of pixels, is above the first row for the current block of video data. However, it is also understood that other pixels may neighbor (left, right, above, or diagonally depending on the implemented scan order) any pixels in the first row of the current block of video data 320 from another block of video data from the same picture. The term "current" in "current block of video data" means that the block of video data is either the current block of video data being encoded or decoded by the video encoder 20 or video decoder 30.

In some examples, the default palette index may be a fixed index or a signaled index for at least each block, slice header, any parameter set such as video parameter set (VPS), sequence parameter set (SPS), picture parameter set (PPS), or elsewhere. In some examples, enabling Copy mode for the first row enables encoding the block of video data using palette mode such that at least one pixel in the first row of pixels in the block of video data is encoded using Copy mode.

The default (fixed) index may be one of the valid palette indices of the current block in the range of 0 to the palette_size−1. For example, the default index may always be equal to 0, however other values are also possible. The default index may depend on other index values signaled in the first row. For example, if the first signaled index is 1 and the second signaled is 2, then, if there is another index, index 1 is likely to appear again. Therefore, the default index may be an index value derived by the copy mode for the first row.

In some examples, the default palette index may be one of the palette indices corresponding to the block of video data 320. In other examples, the default palette index may be the first index in the palette indices corresponding to the block of video data. The default palette index may be identified by a value of zero (or any other value corresponding to another valid palette index of the current block of video data) where the first index in the palette indices is identified by the value of zero. In yet other examples, the default palette index may not be one of the palette indices corresponding to the current block of video data. In such examples, the default palette index may be an index from a palette indices corresponding to another block of video data that was previously encoded or decoded.

For the enabled Copy mode for the first row, the palette index and palette max index can be adjusted prior to signaling, similarly to what it is done for the palette index for other rows in the current block of video data 320. Additionally, it may be defined that the virtual pixels located outside of the current block of video data 320 including the pixels located above of the first row (e.g., from another block of video data previously encoded or decoded) are not escape coded, for example coded with Copy mode, the palette index may be equal to the default palette index. This additional definition may be used to avoid redundancy in the palette index signaling. For example, the pixel mode of the very first pixel cannot be equal to the Run mode with the palette index equal to the default palette index, since this pixel will be coded with the Copy mode.

For example, the implementation can be as follows:
If the pixel is the very first pixel in the block
    max palette index is reduced by 1
    palette index is reduced by 1
Otherwise, if the pixel mode of the left coded pixel in the scanning order is Run mode, the following applies:
    max palette index is reduced by 1
        if palette index is greater than the palette index of the left pixel in the scanning order then the palette index is reduced by 1
Otherwise, if pixel mode of the left coded pixel in the scanning order is Copy mode, and the current pixel is located in the first row, or the pixel is not in the first row and the pixel mode of the directly above pixel is not Escape mode, the following applies:
    max palette index is reduced by 1
        if palette index is greater than the palette index of the above pixel in the scanning order or equal to the default palette index if the above pixel is outside of the block, then the palette index is reduced by 1.

For example, this method can be implemented as follows relative to the SCC WD with additions represented with underlined text and deletions represented with strikethrough text:

```
...
    xC = travScan [scanPos][palette_transpose_flag]
    yC = travScan [scanPos][1 – palette_transpose_flag]
    if ( scanPos >= nCbS && scanPos == 0 || previous_run_type_flag !=
COPY_ABOVE_MODE )
        palette_run_type_flag[ xC ][ yC ]                              ae(v)
    Else
        palette_run_type_flag[ xC ][ yC ] = INDEX_MODE
    previous_run_type_flag = palette_run_type_flag[ xC ][ yC ]
    if( palette_run_type_flag[ xC ][ yC ] = = INDEX_MODE ) {
        adjustedIndexMax = indexMax
        adjustedRefIndex = indexMax + 1
    }
    if(scanPos==0){
        adjustedIndexMax −= 1
        adjustedRefIndex = 0
    }
    if( scanPos > 0 && palette_run_type_flag[ xC − 1 ][ yC ] = =
INDEX_MODE &&
        palette_escape_val_flag [ xC − 1 ][ yC ] ! = 1) {
        adjustedIndexMax −= 1
        adjustedRefIndex = paletteMap[xC − 1][yC]
    }
    if ( scanPos >= nCbS && palette_run_type_flag[ xC − 1 ][ yC ] = =
COPY_ABOVE_MODE
            && palette_escape_val_flag [ xC ][ yC − 1 ] ! =1) {
        adjustedIndexMax −= 1
        adjustedRefIndex = paletteMap[xC][yC − 1]
    }
    if( adjustedIndexMax > 0)
        palette_index                                                   ae(v)
...
```

In techniques described herein, more than one default index may be used. In addition, the order in which the indices are used may have different patterns. The pattern that is used may be fixed and stored at both video encoder 20 and video decoder 30, or the pattern may be signaled from video encoder 20 to video decoder 30, similarly as is done for the default index.

The pixel mode (Run mode or Copy mode) signaling may be added for the first row of the current block of video data 320 when Copy mode is enabled in the first row. In some examples, the syntax elements for pixel mode signaling may be CABAC coded using context modeling. The context of the pixel mode syntax element in the first row may be shared with the contexts for pixel mode syntax elements for other rows of the current block of video data 320. For example context 0 may be used if a reference pixel in coded with the Copy mode, and context 1 may be used if a reference pixel is coded with the Run mode, or vice versa.

The reference pixel may be a left pixel of the current pixel, may be an above pixel starting from the second row, and/or may be a left pixel for the very first row (since there is no above pixel in the first row). More generally, the reference pixel may be an already coded pixel where the pixel mode information is available. For the very first pixel there may not be any reference pixels available. In this situation, the context for the syntax element for the first row may be predefined (e.g., a previously-used context may be selected or a separate context may be used).

In another example, only a single context may be used and the context to code the pixel mode syntax element in the first row may be shared only with context 0 or context 1.

However, sharing the context may not be the best option in all circumstances, since the statistics of using a particular pixel mode in the first row can be different from the statistics in the other rows, since the palette index choice is more limited in the first row (e.g., where only default index/indices are used). As such, in another example, a separate context or separate contexts may be assigned for pixel mode syntax elements for the pixel mode in the first row. For example, the separate context(s) may be only a single additional context, such as context 2, or the separate context(s) may be dependent on the pixel mode of the reference pixel. For example, context 2 may be used to code a pixel mode syntax element if the reference pixel is coded with the Copy mode, and context 3 may be used to code the pixel mode syntax element if the reference pixel is coded in the Run mode. For the syntax element for the very first pixel, the context may be fixed to be context 2 or context 3, or, in another example, a separate context 4 can be used.

As a more general approach, which can be used with or without enabling the Copy mode for the first row, video encoder 20 and/or video decoder 30 may split the contexts according to the reference pixel mode, including the Escape mode, the context for which is currently shared with the Run mode. In this case, the number of contexts may be at least three; one for the Run mode, one for the Copy mode, and one for the Escape mode, where the mode is the mode of the reference pixel.

Similarly, the context extension including Escape mode may be done with the enabled Copy mode for the first row.

Figure 10:
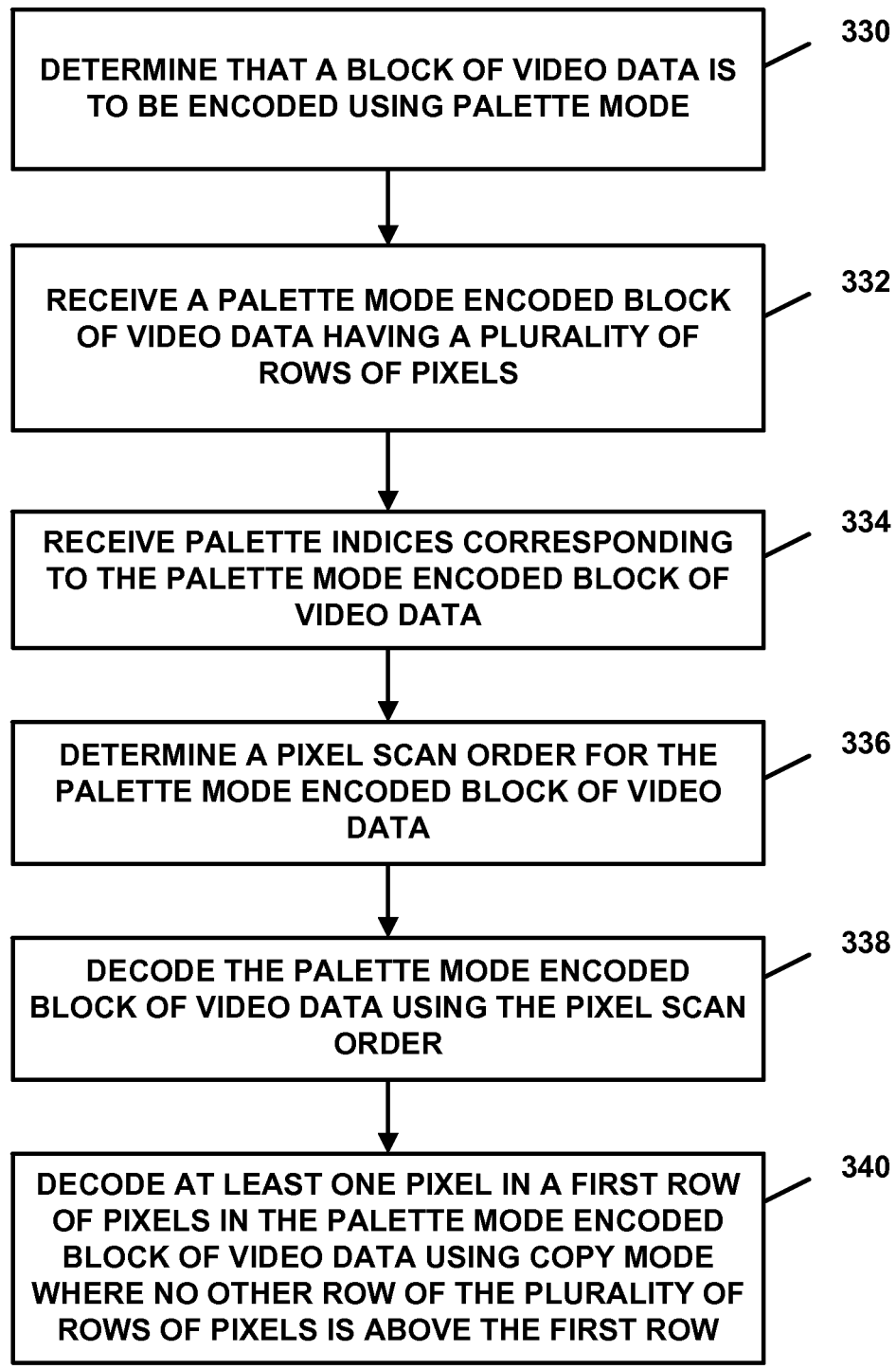
FIG. 10 is a flowchart illustrating an example process for decoding video data consistent with techniques for palette-based video coding of this disclosure.

FIG. 10 is a flowchart illustrating an example process for decoding video data consistent with techniques of this disclosure. The process of FIG. 10 is generally described as being performed by video decoder 30 for purposes of illustration, although a variety of other processors may also carry out the process shown in FIG. 10. In some examples, block decoding unit 152 and/or palette-based decoding unit 165 may perform one or more processes shown in FIG. 10.

In the example of FIG. 10, video decoder 30 may determine (330) that a block of video data is to be encoded using palette mode. Video decoder 30 may receive (332) a palette mode encoded block of video data having a plurality of rows of pixels. Video decoder 30 may receive (334) palette indices corresponding to the palette mode encoded block of video data. Video decoder 30 may determine (336) a pixel scan order for the palette mode encoded block of video data. Video decoder 30 may decode (338) the palette mode encoded block of video data using the pixel scan order. Video decoder 30 may decode (340) at least one pixel in a first row of pixels in the palette mode encoded block of video data using copy mode where no other row of the plurality of rows of pixels is above the first row.

In some examples, decoding at least one pixel in a first row of pixels in the palette mode encoded block of video data using copy mode may include using a default palette index for the least one pixel in the first row of pixels. In other examples, decoding at least one pixel in a first row of pixels in the palette mode encoded block of video data using copy mode may include using a default palette index for the least one pixel in the first row of pixels that is one of the palette indices corresponding to the encoded block of video data. In other examples, decoding at least one pixel in a first row of pixels in the palette mode encoded block of video data using copy mode may include using a default palette index for the least one pixel in the first row of pixels that is the first index in the palette indices.

In yet other examples, decoding at least one pixel in a first row of pixels in the palette mode encoded block of video data using copy mode may include using a default palette index for the least one pixel in the first row of pixels that is identified by the value of zero and the first index in the palette indices is identified by the value of zero. In yet other examples, decoding at least one pixel in a first row of pixels in the palette mode encoded block of video data using copy mode may include using a default palette index for the least one pixel in the first row of pixels that is not one of the palette indices corresponding to the block of video data. In yet other examples, decoding at least one pixel in a first row of pixels in the palette mode encoded block of video data using copy mode may include using a default palette index for the least one pixel in the first row of pixels that is an index from a palette indices corresponding to another block of video data. In yet other examples, decoding at least one pixel in a first row of pixels in the palette mode encoded block of video data using copy mode may include using a palette index for the at least one pixel in the first row of pixels based on one or more palette indices of one or more pixels decoded before the at least one pixel.

Figure 11:
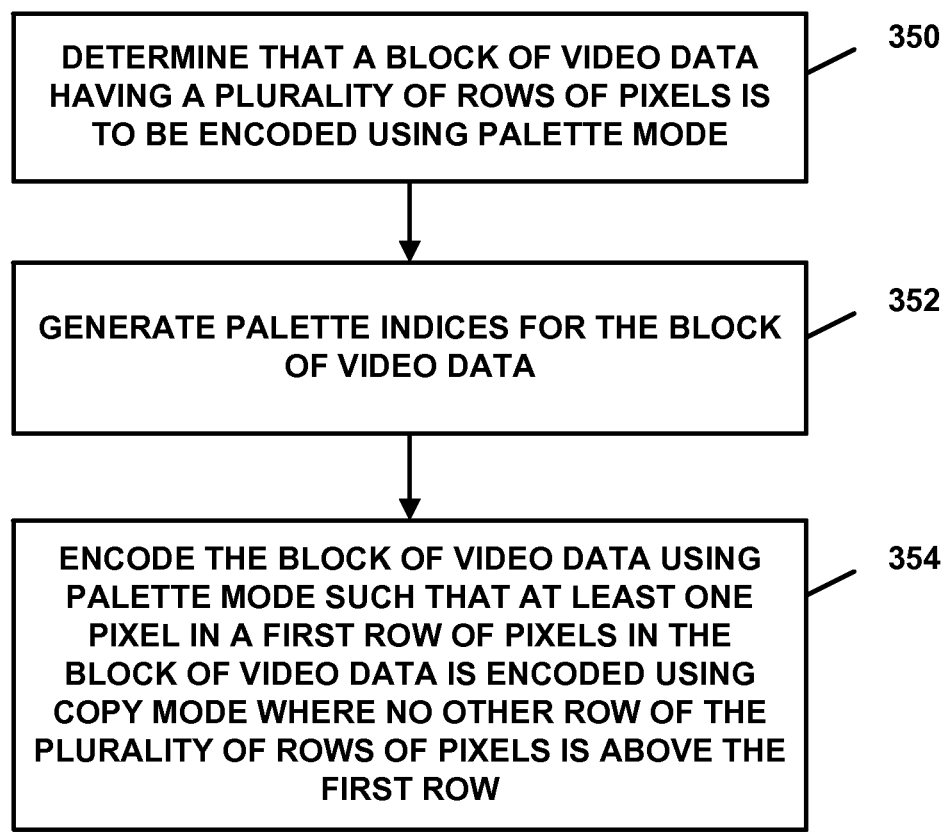
FIG. 11 is a flowchart illustrating an example process for encoding video data consistent with techniques for palette-based video coding of this disclosure.

FIG. 11 is a flowchart illustrating an example process for encoding video data consistent with techniques of this disclosure. The process of FIG. 11 is generally described as being performed by video encoder 20 for purposes of illustration, although a variety of other processors may also carry out the process shown in FIG. 11. In some examples, block encoding unit 100 and/or palette-based encoding unit 122 may perform one or more processes shown in FIG. 11.

In the example of FIG. 11, video encoder 20 may determine (350) that a block of video data having a plurality of rows of pixels is to be encoded using palette mode. Video encoder 20 may generate (352) palette indices for the block of video data. Video encoder 20 may encode (354) the block of video data using palette mode such that at least one pixel in a first row of pixels in the block of video data is encoded using copy mode where no other row of the plurality of rows of pixels is above the first row.

In some examples, encoding the block of video data using palette mode such that at least one pixel in the first row of pixels in the block of video data is encoded using copy mode may include using a default palette index for the least one pixel in the first row of pixels. In such examples, the default palette index may be one of the palette indices corresponding to the block of video data. For example, the default palette index may be the first index in the palette indices or any other index in the palette indices. The default palette index may be identified by the value of zero and the first index in the palette indices may be identified by the value of zero. In some examples, the default palette index may not be one of the palette indices corresponding to the block of video data. For example, the default palette index may be an index from a palette indices corresponding to another block of video data (e.g., from a palette indices from a previously encoded block of video data). In some examples, encoding the block of video data using palette mode such that at least one pixel in the first row of pixels in the block of video data is encoded using copy mode may include using a palette index for the at least one pixel in the first row of pixels based on one or more palette indices of one or more pixels encoded before the at least one pixel.

The following section will discuss escape pixels and Copy mode. In current proposals for palette coding, when the above pixel is coded with the Escape mode, the copying procedure is not defined for the escape coded pixel. The solution can be either to define a copying process for the escape pixel or normatively prohibit this case to happen. As examples, the problem can be solved using one of the following methods described below.

As described in the U.S. Provisional Application No. 62/019,223, filed Jul. 2, 2014, the only escape mode represented by a specific palette index is copied for the current pixel. The escape color values for the triplet are signaled afterwards.

Instead of copying an escape index, another palette index can be assigned for the current pixel if the above pixel is an escape pixel. For example, the palette index can be a default palette index which can be fixed, for example, being equal to one of the valid palette indices for the current block, such as 0, or the default palette index can be signaled at least for each block, slice header, parameter sets (such as VPS, SPS, PPS), or be signaled elsewhere. Additionally or alternatively, the escape pixel can be substituted by a previous non-escape palette index. For example, the index for Copy mode is assumed to be the last copied index that is not an escape such the first available on the left of the above pixel in the scanning order, or can be the left index of the current pixel. This can be combined with the fixed index. For example, if the substituting escape palette index is escape, then the default index can be used. For example, if the left pixel is an escape pixel, then the default index (e.g., 0) is used to replace the escape for copying purpose, otherwise the index of the left pixel is used.

In another example, video encoder 20 may be configured to normatively disallow the case that the pixel coded with Copy mode can have the above pixel coded with Escape mode. This, for example, can be implemented in the semantics of the palette_run syntax element, as shown below. If this rule is broken, then the bitstream is considered to be non-conformant to the standard.

The syntax element palette_run indicates the number of consecutive locations minus 1 with the same palette index as the position in the above row when palette_run_type_flag is equal to COPY_ABOVE_MODE or represents the number of consecutive locations minus 1 with the same palette index when palette_run_type_flag is equal to INDEX_MODE. If palette_run_type_flag is equal to COPY_ABOVE_MODE, one of the consecutive pixels defined by the palette_run value located in the above row cannot be coded as ESCAPE PIXEL.

The following section discusses techniques for defining an escape pixel according to some examples. If the techniques described above for palette size definition are used, it may happen that a particular index denotes an escape pixel or a non-escape pixel depending on the value of the palette_escape_val_present_flag. For example, consider that the maximum palette size is 32. If palette_escape_val_present_flag is 1, the index value 31 denotes an escape pixel. On the other hand, when palette_escape_val_present_flag is 0, an index value of 31 is possible for a non-escape pixel. A similar situation applies if some other value, such as 0, is used to denote an escape pixel. In this case, an index value of 0 may represent an escape pixel when palette_escape_val_present_flag is 1, but a non-escape pixel when palette_escape_val_present_flag is 0.

Hence, according to some examples, this disclosure proposes to change the definition of an escape pixel as follows: A pixel is defined as an escape pixel if palette_escape_val_present_flag is equal to 1, the pixel is coded in Run mode, and has a specific palette index value. The specific index value may, for example, be equal to the palette size or palette size minus 1, or some other fixed value such as 0.

This section of the disclosure discusses palette sharing with new palette entries. In this disclosure, it is proposed to extend the palette sharing with the ability to signal new palette entries. The number of new entries and the color values of the new entries itself are explicitly signaled when there is room in the palette for their inclusion (i.e., the palette size is smaller than max_palette_size).

The palette sharing extension of this disclosure may replace current proposals for palette sharing (i.e., the number of new entries is signaled for the palette sharing, or be added as a third method of the palette derivation). In the latter case, a new flag is signaled, possibly after palette_share_flag and conditionally if the palette sharing is not used and the previous palette size is smaller than the max_palette_size, to indicate that the palette predictor is not signaled and the palette of the previous block is reused. In this case, the number of new entries is greater than 0 since having a zero number of the new entries is the same as just palette sharing, so the number of new entries minus 1 can be signaled instead.

The new palette entries are signaled afterwards by video encoder 20 and can be included after reused palette entries or before the reused palette entries for the third (discussed in this section) method of the palette derivation. Alternatively, new palette entries can be always be placed before the reused palette entries to have a uniform palette derivation across all palette derivation methods.

Including new entries before the reused entries may be more efficient since the entries of the previous palette playing a role of the reused or predicted entries may not all be used introducing some inefficiency in the palette index signaling, contrary to the new entries that are all used in the block. Another advantage of placing the new entries before the reused palette entries is that not all reused entries can be added due to the palette size limitation. In this case, the new entries are added first and then the entries of the previous palette are added while the current palette size is smaller than the max_palette_size.

When using palette sharing with new palette entries, the existing signaling can be reused in the following way with additions to the SCC WD represented by underlined text:

| if( ( palette_share_flag == 0&& numPredPreviousPalette < max_palette_size ) ||(palette_share_flag==1&&palette_size <max_palette_size ) ) | |
|---|---|
| palette_num_signalled_entries | ae(v) |

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

Certain aspects of this disclosure have been described with respect to the developing HEVC standard for purposes of illustration. However, the techniques described in this disclosure may be useful for other video coding processes, including other standard or proprietary video coding processes not yet developed.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure. The techniques described in this disclosure may be used together in any combination.

In one or more examples, the functions described in this disclosure may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding a bitstream of encoded video data, the method comprising:
   receiving a first palette mode encoded block of video data of a picture;
   determining a palette size for the first palette mode encoded block;
   determining if the first palette mode encoded block is permitted to contain an escape pixel;
   determining whether a first condition or a second condition is true for the first palette mode encoded block, the first condition being that a palette size for a palette mode encoded block is equal to 0 and the second condition being that the palette size for the palette mode encoded block is equal to 1 and the palette mode encoded block does not contain the escape pixel;
   in response to determining that one of the first condition or the second condition is true for the first palette mode encoded block, inferring a pixel scan order for the first palette mode encoded block of video data without receiving, in the bitstream of encoded video data, a value for a block-level syntax element representative of the pixel scan order for the first palette mode encoded block, wherein inferring the pixel scan order for the first palette mode encoded block of video data comprises inferring the value of the block-level syntax element for the first palette mode encoded block such that a transpose process is not to be applied to palette indices associated with the first palette mode encoded block of video data to decode the first palette mode encoded block of video data, wherein the inferred value of the block-level syntax element for the first palette mode encoded block is zero;

decoding the first palette mode encoded block of video data using the inferred pixel scan order;

receiving a second palette mode encoded block of video data of the picture;

determining whether the first condition or the second condition is true for the second palette mode encoded block;

only in response to determining that both the first condition and the second condition are false for the second palette mode encoded block, decoding a block-level syntax element having a value representative of a pixel scan order for the second palette mode encoded block of video data;

determining the pixel scan order for the second palette mode encoded block of video data based on the decoded block-level syntax element; and decoding the second palette mode encoded block of video data using the determined pixel scan order.

2. The method of claim 1, wherein the block-level syntax element for the second palette mode encoded block is a palette_transpose_flag comprising values zero or one, wherein the value of zero indicates the transpose process is not to be applied to palette indices associated with the second palette mode encoded block of video data and the value of one indicates the transpose process is to be applied to palette indices associated with the second palette mode encoded block of video data.

3. A device for decoding a bitstream of encoded video data, the device comprising:

a memory configured to store video data of a picture; and a video decoder comprising one or more processors implemented in circuitry and configured to:

receive a first palette mode encoded block of the video data;

determine a palette size for the first palette mode encoded block;

determine if the first palette mode encoded block is permitted to contain an escape pixel;

determine whether a first condition or a second condition is true for the first palette mode encoded block, the first condition being that a palette size for a palette mode encoded block is equal to 0 and the second condition being that the palette size for the palette mode encoded block is equal to 1 and the palette mode encoded block does not contain the escape pixel;

in response to determining that one of the first condition or the second condition is true for the first palette mode encoded block, infer a pixel scan order for the first palette mode encoded block of video data without receiving, in the bitstream of encoded video data, a value for a block-level syntax element representative of the pixel scan order for the first palette mode encoded block, wherein to infer the pixel scan order for the first palette mode encoded block of video data, the video decoder is further configured to infer the value of the block-level syntax element for the first palette mode encoded block such that a transpose process is not to be applied to palette indices associated with the first palette mode encoded block of video data to decode the first palette mode encoded block of video data, wherein the inferred value of the block-level syntax element for the first palette mode encoded block is zero;

decode the first palette mode encoded block of video data using the inferred pixel scan order;

receive a second palette mode encoded block of video data of the picture;

determine whether the first condition or the second condition is true for the second palette mode encoded block;

only in response to determining that both the first condition and the second condition are false for the second palette mode encoded block, decode a block-level syntax element having a value representative of a pixel scan order for the second palette mode encoded block of video data;

determine the pixel scan order for the second palette mode encoded block of video data based on the decoded block-level syntax element for the second palette mode encoded block of video data; and decode the second palette mode encoded block of video data based on the determined pixel scan order.

4. The device of claim 3, wherein the block-level syntax element for the second palette mode encoded block is a palette_transpose_flag comprising values zero or one, wherein the value of zero indicates the transpose process is not to be applied to palette indices associated with the second palette mode encoded block of video data and the value of one indicates the transpose process is to be applied to palette indices associated with the second palette mode encoded block of video data.

5. A non-transitory computer-readable storage medium having instructions stored thereon that, when executed, cause one or more processors of a computing device configured to decode a bitstream of encoded video data to:

receive a first palette mode encoded block of video data of a picture;

determine a palette size for the first palette mode encoded block;

determine if the first palette mode encoded block is permitted to contain an escape pixel;

determine whether a first condition or a second condition is true for the first palette mode encoded block, the first condition being that a palette size for a palette mode encoded block is equal to 0 and the second condition being that the palette size for the palette mode encoded block is equal to 1 and the palette mode encoded block does not contain the escape pixel;

in response to determining that one of the first condition or the second condition is true for the first palette mode encoded block, infer a pixel scan order for the first palette mode encoded block of video data without receiving, in the bitstream of encoded video data, a value for a block-level syntax element representative of the pixel scan order for the first palette mode encoded block, wherein to infer the pixel scan order for the first palette mode encoded block of video data, the instructions cause the one or more processors to infer the value of the block-level syntax element for the first palette mode encoded block such that a transpose process is not to be applied to palette indices associated with the first palette mode encoded block of video data to decode the first palette mode encoded block of video data, wherein the inferred value of the block-level syntax element for the first palette mode encoded block is zero;

decode the first palette mode encoded block of video data using the inferred pixel scan order;

receive a second palette mode encoded block of video data of the picture;

determine whether the first condition or the second condition is true for the second palette mode encoded block;

only in response to determining that both the first condition and the second condition are false for the second palette mode encoded block, decode a block-level syntax element having a value representative of a pixel scan order for the second palette mode encoded block of video data;

determine the pixel scan order for the second palette mode encoded block of video data based on the decoded block-level syntax element for the second palette mode encoded block of video data; and decode the second palette mode encoded block of video data based on the determined pixel scan order.

\* \* \* \* \*